(12) United States Patent
Drahm et al.

(10) Patent No.: US 11,073,416 B2
(45) Date of Patent: Jul. 27, 2021

(54) MEASURING SYSTEM HAVING A MEASURING TRANSDUCER OF VIBRATION-TYPE

(71) Applicant: ENDRESS + HAUSER FLOWTEC AG, Reinach (CH)

(72) Inventors: Wolfgang Drahm, Erding (DE); Hao Zhu, Freising (DE); Alfred Rieder, Landshut (DE); Michael Wiesmann, Freising (DE); Patrick Oudoire, Soultz (FR)

(73) Assignee: Endress + Hauser Flowtec AG, Reinach (CH)

( * ) Notice: Subject to any disclaimer, the term of this patent is extended or adjusted under 35 U.S.C. 154(b) by 370 days.

(21) Appl. No.: 15/794,279

(22) Filed: Oct. 26, 2017

(65) Prior Publication Data

US 2018/0058893 A1   Mar. 1, 2018

Related U.S. Application Data

(63) Continuation of application No. 13/292,168, filed on Nov. 9, 2011, now abandoned.

(Continued)

(30) Foreign Application Priority Data

Nov. 11, 2010  (DE) .................. 10 2010 050927.2
Nov. 19, 2010  (DE) .................. 10 2010 044 179.1

(51) Int. Cl.
  *G01F 1/84*   (2006.01)
  *G01F 15/02*  (2006.01)

(52) U.S. Cl.
  CPC .......... *G01F 1/8413* (2013.01); *G01F 1/8436* (2013.01); *G01F 1/8472* (2013.01); *G01F 15/022* (2013.01)

(58) Field of Classification Search
  CPC ..................................... G01F 1/8413
  (Continued)

(56) References Cited

U.S. PATENT DOCUMENTS 6,254,069 B1 * 7/2001 Muramatsu ........... F16F 13/264
                                                                  248/550
6,477,902 B1 * 11/2002 Oosawa ................ G01F 1/8409
                                                                  73/861.355

(Continued)

FOREIGN PATENT DOCUMENTS

DE    102005044008 A1   3/2007
DE    102007061690 A1   6/2008
WO      2009134830 A1   4/2009

*Primary Examiner* — Eman A Alkafawi
(74) *Attorney, Agent, or Firm* — Christopher R. Powers; Endress+Hauser (USA) Holding Inc.

(57) ABSTRACT

A measuring system comprises: a measuring transducer; transmitter electronics; at least one measuring tube; and at least one oscillation exciter. The transmitter electronics delivers a driver signal for the at least one oscillation exciter, and for feeding electrical, excitation power into the at least one oscillation exciter. The driver signal, has a sinusoidal signal component which corresponds to an instantaneous eigenfrequency, and in which the at least one measuring tube can execute, or executes, eigenoscillations about a resting position. The eigenoscillations have an oscillation node and in the region of the wanted, oscillatory length exactly one oscillatory antinode. The driver signal has, a sinusoidal signal component with a signal frequency, which deviates from each instantaneous eigenfrequency of each natural mode of oscillation of the at least one measuring tube, in each case, by more than 1 Hz and/or by more than 1% of said eigenfrequency.

31 Claims, 9 Drawing Sheets

Related U.S. Application Data

(60) Provisional application No. 61/412,639, filed on Nov. 11, 2010.

(58) Field of Classification Search
USPC .............................................. 702/48, 50, 54
See application file for complete search history.

(56) References Cited

U.S. PATENT DOCUMENTS

| | | | | |
|---|---|---|---|---|
| 2003/0097883 | A1* | 5/2003 | Pawlas | G01F 1/84 73/861.355 |
| 2006/0156831 | A1* | 7/2006 | Rieder | G01F 1/8422 73/861.356 |
| 2007/0186682 | A1* | 8/2007 | Duffill | G01F 25/0007 73/861.354 |
| 2008/0237366 | A1* | 10/2008 | Ehlert | F02D 41/2467 239/102.2 |
| 2009/0173169 | A1* | 7/2009 | Bitto | G01F 1/8418 73/861.355 |
| 2010/0134304 | A1* | 6/2010 | Weinstein | G01F 1/74 340/632 |
| 2010/0263456 | A1* | 10/2010 | Griffin | G01F 1/8477 73/861.357 |
| 2011/0035166 | A1* | 2/2011 | Henry | G01F 1/8431 702/48 |
| 2011/0167907 | A1* | 7/2011 | Bitto | G01F 1/84 73/32 A |

* cited by examiner

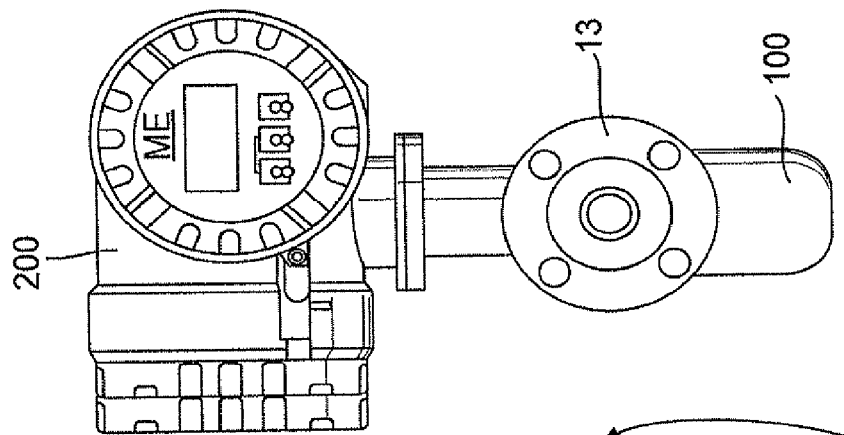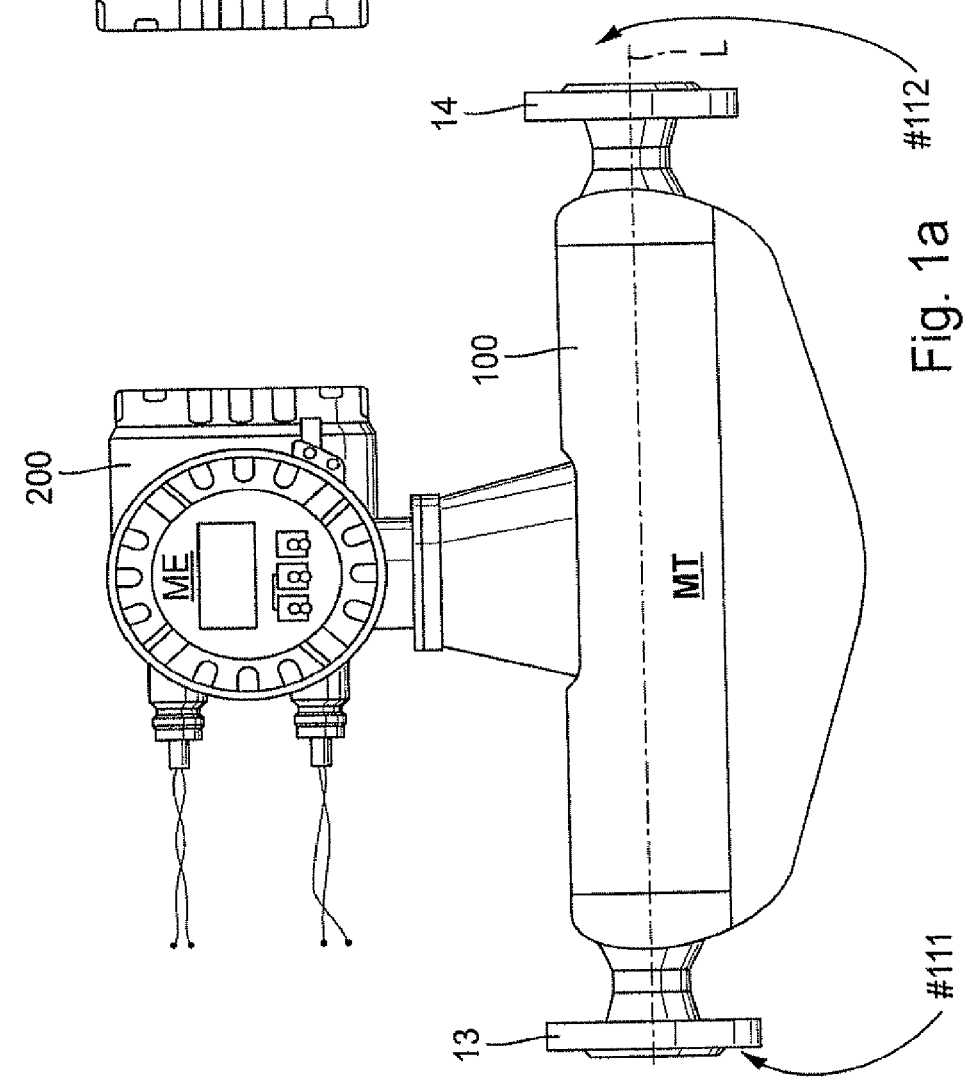

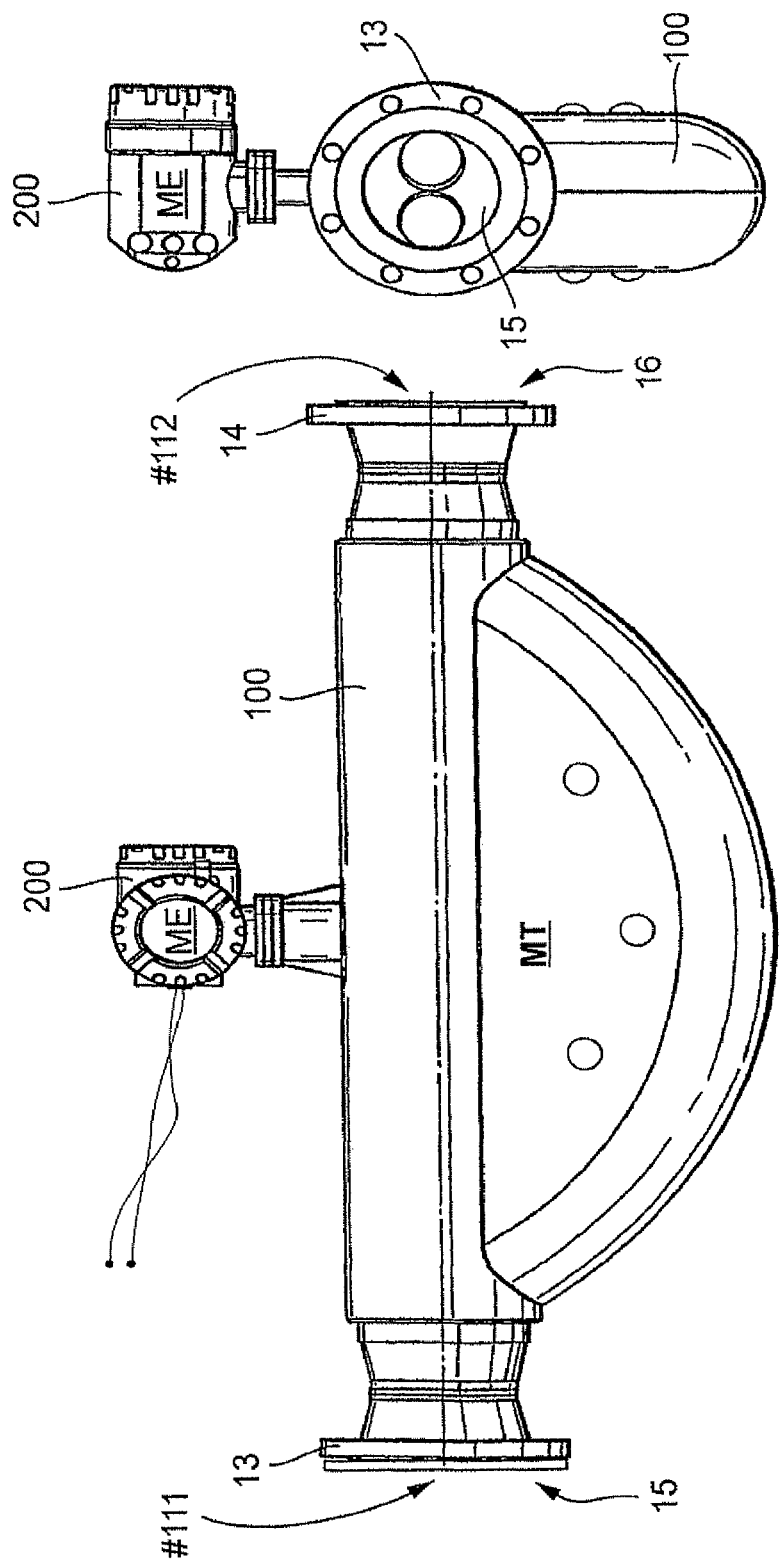

MEASURING SYSTEM HAVING A MEASURING TRANSDUCER OF VIBRATION-TYPE

CROSS-REFERENCE TO RELATED APPLICATION

This application is a continuation application of U.S. patent application Ser. No. 13/292,168, filed on Nov. 9, 2011, which claims the benefit of U.S. Provisional Application 61/412,639, filed on Nov. 11, 2010, of which the entire disclosure of the pending, prior application is hereby incorporated by reference.

TECHNICAL FIELD

The invention relates to a measuring system, especially a measuring system embodied as a compact measuring device and/or a Coriolis, mass flow measuring device, for flowable media, especially fluid media, which measuring system comprises: a measuring transducer of the vibration-type, through which, during operation, a medium flows at least at times and which generates oscillation signals influenced by at least one measured variable, especially a mass flow, a density, a viscosity, etc., characterizing the flowing medium; as well as transmitter electronics electrically coupled with the measuring transducer and processing measured values oscillation signals delivered by the measuring transducer.

BACKGROUND DISCUSSION

In industrial measurements technology, especially also in connection with the control and monitoring of automated manufacturing processes, or process plants, for ascertaining characteristic measured variables of media flowing in a process line, for example, a pipeline, for example, media such as liquids and/or gases, pastes or powder or other flowable, measured substances, often such measuring systems are used, which, by means of a measuring transducer of the vibration-type and a thereto connected, most often in a separate electronics-housing accommodated, transmitter electronics, induce in the flowing medium reaction forces, for example, Coriolis forces, and from these produce measured values correspondingly representing media parameters and derived repetitively from the at least one measured variable correspondingly characterizing the medium, for example, a mass flow rate, a density, a viscosity, etc.

Such measuring systems, which are often formed by means of an in-line measuring device of compact construction with integrated measuring transducer, as, for instance, a Coriolis, mass flow meter, are long since known and have proved themselves in industrial use. Examples for such measuring systems with a measuring transducer of the vibration-type or also individual components thereof, are described e.g. in EP-A 317 340, EP-A 816 807, JP-A 8-136311, JP-A 9-015015, US-A 2006/0112774, US-A 2007/0062308, US-A 2007/0113678, US-A 2007/0119264, US-A 2007/0119265, US-A 2007/0151370, US-A 2007/0151371, US-A 2007/0186685, US-A 2008/0034893, US-A 2008/0041168, US-A 2008/0141789, US-A 2010/0050783, US-A 2010/0139416, US-A 2010/0139417, US-A 2010/0236338, US-A 2010/0242623, US-A 2010/0242624, US-A 2010/0011882, US-A 2010/0251830, U.S. Pat. Nos. 4,680,974, 4,738,144, 4,777,833, 4,801,897, 4,823,614, 4,879,911, 5,009,109, 5,024,104, 5,050,439, 5,291,792, 5,359,881, 5,398,554, 5,476,013, 5,531,126, 5,602,345, 5,691,485, 5,734,112, 5,796,010, 5,796,011, 5,796,012, 5,804,741, 5,861,561, 5,869,770, 5,945,609, 5,979,246, 6,047,457, 6,092,429, 6,073,495, 6,311,136, 6,223,605, 6,330,832, 6,397,685, 6,513,393, 6,557,422, 6,651,513, 6,666,098, 6,691,583, 6,840,109, 6,868,740, 6,883,387, 7,017,424, 7,040,179, 7,073,396, 7,077,014, 7,080,564, 7,134,348, 7,216,550, 7,299,699, 7,305,892, 7,360,451, 7,392,709, 7,406,878, 7,562,586, WO-A 00/14485, WO-A 01/02816, WO-A 03/021205, the WO-A 2004/072588, WO-A 2005/040734, WO-A 2005/050145, WO-A 2007/097760, WO-A 2008/013545, WO-A 2008/077574, WO-A 95/29386, WO-A 95/16897, WO-A 96/05484, WO-A 99/40394 or the non pre-published German patent applications DE 102009055069.0, or DE 102010039627.3 of the assignee. Each of the therein shown measuring transducers comprises at least one, essentially straight or curved, measuring tube accommodated in a measuring transducer housing for conveying the medium flowing, in given cases, extremely rapidly or even extremely slowly. The at least one measuring tube, which, on an inlet-side, first measuring tube end communicating with the respective process line and an outlet-side, second measuring tube end equally communicating with the process line, in each case, is coupled mechanically with the measuring transducer housing and which extends between the two measuring tube ends with an essentially free, wanted, oscillatory length, is actively excited during operation, in a manner known, per se, to those skilled in the art, to execute vibrations about a resting position in an oscillation form—the so-called wanted mode—suited for the particular measuring, for the purpose of generating oscillations influenced by the medium flowing through, consequently the parameters of the medium to be measured in each case, or for the purpose of generating therewith corresponding, oscillation signals.

In the case of measuring transducers with two or more measuring tubes, these are most often integrated into the process line via a flow divider extending on the inlet side between the measuring tubes and an inlet-side connecting flange as well as via a flow divider extending on the outlet side between the measuring tubes and an outlet-side connecting flange. In the case of measuring transducers with a single measuring tube, such communicates with the process line most often via an essentially straight, connecting tube piece opening on the inlet side as well as via an essentially straight, connecting tube piece opening on the outlet side. Additionally, each of the disclosed measuring transducers with a single measuring tube comprises at least one counteroscillator, which can be one piece or made of a plurality of parts and is shaped, for example, in the form of a tube, a box or a plate. The counteroscillator is coupled to the measuring tube on the inlet side to form a first coupling zone and on the outlet side to form a second coupling zone. During operation, the counteroscillator essentially rests or else it oscillates opposite-equally to the measuring tube, thus with equal frequency and opposite phase. The inner part of the measuring transducer formed by means of measuring tube and counteroscillator is most often held alone by means of the two connecting tube pieces (via which the measuring tube communicates during operation with the process line) in a protective measuring transducer housing, especially in a manner enabling oscillations of the inner part. In the case of the measuring transducer shown, for example, in U.S. Pat. Nos. 5,291,792, 5,796,010, 5,945,609, 7,077,014, US-A 2007/0119264, WO-A 01 02 816 or also WO-A 99 40 394, where the transducer has a single, essentially straight, measuring tube, the latter and the counteroscillator are, as quite usual in the case of conventional measuring transducers, oriented essentially coaxially relative to one another. In the case of usually marketed measuring transducers of the aforementioned type, most often also the counteroscillator is essentially tubular and embodied as an essentially straight, hollow cylinder, which is so arranged in the measuring transducer that the measuring tube is jacketed at least partially by the counteroscillator. The material of such counteroscillators, especially also in the case of application of titanium, tantalum or zirconium for the measuring tube, comprises, most often, comparatively cost effective types of steel, such as, for instance, structural steel or free-machining steel.

In the case of measuring systems of the type being discussed, serving as wanted mode is usually one of a plurality of the natural oscillation modes inherent to the measuring tube, i.e. the at least one measuring tube is actively excited principally to resonance oscillations, so that it executes in the wanted mode predominantly eigenoscillations with one of its instantaneous eigenfrequencies. Most often serving as wanted mode is a natural oscillatory mode of first order, the so-called fundamental mode, of the at least one measuring tube, in which the at least one measuring tube can execute, or executes, eigenoscillations about its resting position, which eigenoscillations have in the region of the first and second measuring tube ends, in each case, an oscillation node and in the region of the wanted, oscillatory length exactly one oscillatory antinode. Especially, in the case of measuring transducers with curved, e.g. U-, V- or Ω-shaped, measuring tube, or measuring tubes, the wanted mode usually selected is that eigenoscillation form, also referred to as the bending oscillation, fundamental mode, in the case of which the particular measuring tube at least partially moves in a pendulum-like manner about an imaginary longitudinal axis of the measuring transducer in the manner of a cantilever clamped only on the end, whereby Coriolis forces are induced in the through flowing medium dependent on mass flow. These, in turn, lead to the fact that on the excited oscillations of the wanted mode, in the case of curved measuring tubes, thus pendulum-like cantilever oscillations, there are superimposed bending oscillations of equal frequency according to a natural oscillatory mode of higher order, the so-called Coriolis mode. In the case of measuring transducers with curved measuring tube, these cantilever oscillations in the Coriolis mode forced by Coriolis forces correspond usually to that oscillatory mode, in which the at least one measuring tube also executes rotary oscillations about an imaginary vertical axis directed perpendicularly to the longitudinal axis. In the case of measuring transducers with straight, measuring tube, in contrast, for the purpose of producing mass flow dependent, Coriolis forces, often such a natural oscillatory mode is selected as wanted mode, in the case of which the measuring tube executes, at least partially, bending oscillations essentially in a single imaginary plane of oscillation, for example, in turn, a bending oscillation, fundamental mode having a single oscillatory antinode, so that the oscillations in the Coriolis mode are embodied accordingly as coplanar bending oscillations of frequency equal to that of the wanted mode oscillations. These oscillations in the Coriolis mode correspond as regards their oscillatory form essentially to a bending oscillation mode of second order. Due to the superpositioning of wanted- and Coriolis modes, the oscillations of the vibrating measuring tube registered by means of the sensor arrangement on the inlet side and on the outlet side have a measurable phase difference also dependent on mass flow.

Usually, the measuring tubes of such measuring transducers, e.g. measuring transducers applied in Coriolis, mass flow meters, are, during operation, exclusively or at least predominantly, excited to an instantaneous eigenfrequency of the oscillation form selected for the wanted mode, for example, thus a lowest eigenfrequency, consequently thus caused to vibrate in resonance, this most often also in the case of oscillation amplitude controlled to be constant. Since the eigenfrequency of each natural oscillation mode of the at least one measuring tube depends, especially, also on the instantaneous density of the medium, the density of flowing media can also be measured by means of market-usual Coriolis, mass flow meter, in addition to mass flow. Additionally, it is also possible, as, for example, disclosed in U.S. Pat. No. 6,651,513 or 7,080,564, by means of measuring transducers of vibration-type, directly to measure viscosity of the through flowing medium, for example, based on an exciter energy, or excitation power required to maintain the oscillations and/or based on an attenuation of oscillations of the at least one measuring tube (especially oscillations in the aforementioned wanted mode) resulting from a dissipation of oscillatory energy. Moreover, it is also possible to ascertain other measured variables (such as, for instance, Reynolds number, according to U.S. Pat. No. 6,513,393) derived from the aforementioned parameters, i.e. mass flow rate, density and viscosity, serving as primary measured values for the medium.

For the active exciting of oscillations of the at least one measuring tube, measuring transducers of vibration-type have, additionally, an exciter mechanism driven during operation by an electrical driver signal generated by a driver circuit provided in the mentioned transmitter electronics and correspondingly conditioned, e.g. with an electrical current controlled as regards frequency, phase relationship and amplitude. The exciter mechanism excites the measuring tube to execute oscillations in the wanted mode, thus resonance oscillations, by means of at least one electro-mechanical, oscillation exciter, especially an electro-dynamic, oscillation exciter, through which an electrical current flows during operation and which acts essentially directly on the measuring tube. Furthermore, such measuring transducers comprise a sensor arrangement having oscillation sensors, especially electro-dynamic, oscillation sensors, for the at least point registering of inlet-side and/or outlet-side oscillations of the at least one measuring tube, especially oscillations in the Coriolis mode, and for producing electrical voltages influenced by parameters (such as, for instance, mass flow or density) of the medium and serving as oscillation signals of the measuring transducer. As, for example, described in U.S. Pat. No. 7,216,550, in the case of measuring transducers of the type being discussed, in given cases, also the oscillation exciter can be used, at least at times, as an oscillation sensor and/or an oscillation sensor can be used, at least at times, as an oscillation exciter. For the purpose of driving the mentioned wanted mode in the initially mentioned manner, in the case of most conventional (especially also those usually marketed) measuring systems of the type being discussed, the driver signal delivered by the transmitter electronics has, at least at times, a single, or at least a dominating, signal component with a signal frequency, which corresponds to an instantaneous eigenfrequency of the mentioned natural mode of oscillation of first order, for example, thus of the bending oscillation, fundamental mode, of the at least one measuring tube. As a result of this, thus, the at least one measuring tube, excited by the at least one oscillation exciter, executes, at least partially, most often also predominantly, resonance oscillations, namely resonance oscillations with an oscillation frequency corresponding to the instantaneous eigenfrequency of the mode of oscillation of first order, and also the at least one oscillatory signal has, accordingly, at least at times, a signal component with a signal frequency, which corresponds to the signal frequency of the signal component of the driver signal, consequently the instantaneous eigenfrequency of the therewith excited mode of oscillation of first order.

The exciter mechanism of measuring transducers of the type being discussed includes usually at least one electrodynamic oscillation exciter, and/or an oscillation exciter, acting differentially on the at least one measuring tube and on the, in given cases, present counteroscillator, or on an, in given cases present, other measuring tube, for converting electrical excitation power into vibrations of the at least one measuring tube, while the sensor arrangement includes at least one, most often likewise electrodynamic, oscillation sensor for registering vibrations of the at least one measuring tube, for example, thus inlet-side or outlet-side, bending oscillations, and for producing an oscillation signal representing said—, for instance, inlet-side, or outlet-side—vibrations at least of the at least one measuring tube. Predominantly (especially, however, for the mentioned case, in which the measuring system is embodied as a Coriolis, mass flow measuring device serving for registering mass flow rates, or mass flows), the sensor arrangement includes, supplementally to the one—inlet-side—oscillation sensor, at least one—outlet-side—oscillation sensor constructed essentially equally to the inlet-side sensor. Such electrodynamic and/or differential, oscillation exciters of usually marketed measuring transducers of vibration-type, consequently of usually marketed measuring systems of the type being discussed, are formed by means of components including: A magnet coil, through which an alternating electrical current flows, at least at times, and which, in the case of measuring transducers with one measuring tube and a thereto coupled, counteroscillator, is most often affixed on the latter; as well as a rather elongated, especially rod-shaped, permanent magnet correspondingly affixed to the measuring tube to be set in motion and serving as an armature interacting with the at least one magnet coil, especially a permanent magnet plunging in the coil. The permanent magnet and the magnet coil serving as exciter coil are, in such case, usually so oriented that they are essentially coaxial relative to one another. Additionally, in the case of conventional measuring transducers, the exciter mechanism is usually embodied and placed in the measuring transducer in such a manner that it acts essentially centrally on the at least one measuring tube. In such case, the oscillation exciter (and, thus, the exciter mechanism) is, as, for example, also disclosed in the case of the measuring transducers proposed in U.S. Pat. No. 5,796,010, 6,840,109, 7,077,014 or 7,017,424, most often affixed at least pointwise along an imaginary central peripheral line of the measuring tube outwardly thereon. Alternatively to an exciter mechanism formed by means of oscillation exciters acting rather centrally and directly on the measuring tube, as, among other things, provided in U.S. Pat. No. 6,557,422, 6,092,429 or dit 4,823,614, for example, also exciter mechanisms formed by means of two oscillation exciters affixed not at the half-length of the measuring tube, but, instead, rather on the inlet—, or on the outlet side thereof can be used, or, as, among other things, provided in U.S. Pat. No. 6,223,605 or 5,531,126, for example, also by means of an exciter mechanism formed by an oscillation exciter acting between the, in given cases present, counteroscillator and the measuring transducer housing. In the case of most, usually marketed measuring transducers of vibration-type, the oscillation sensors of the sensor arrangement are, as already indicated, at least, insofar as they work according to the same principle of action, embodied essentially of equal construction as the at least one oscillation exciter. Accordingly, also the at least one oscillation sensor, or the oscillation sensors, of such a sensor arrangement are most often, in each case, formed by means of: At least one coil, which is usually affixed on the, in given cases present, counteroscillator, at least at times passed through by a variable magnetic field, and, associated therewith, has, at least at times, an induced, measurement voltage; as well as a permanently magnetic armature affixed on the measuring tube, and interacting with the at least one coil, for delivering the magnetic field. Each of the aforementioned coils is additionally connected by means of at least one pair of electrical connecting lines with the mentioned transmitter electronics of the in-line measuring device, wherein these lines are most often led on as short as possible paths from the coils via the counteroscillator to the measuring transducer housing.

As, among other things, discussed in the initially mentioned U.S. Pat. Nos. 7,392,709, 7,562,586, US-A 2007/0113678, WO-A 99/39164, or WO-A 03/021205, measuring transducers of vibration-type, consequently the therewith formed measuring systems, can, during their lives extending, most often, over a number of years, be exposed to a large number of loadings, which effect considerable deviations of the measuring system from a reference state ascertained therefor earlier, for instance, at the time of a calibrating in the plant of the manufacturer and/or at a start-up of the measuring. As a result thereof, the accuracy of measurement of the measuring system, with which registered parameters of the medium are ultimately mapped into the corresponding measured values, can be significantly reduced. As examples for such loadings, including wear, ultimately irreversibly changing the oscillatory behavior of the at least one measuring tube, be they loadings occurring once or multiply recurring, or durably or only over a short period of time, one can mention, by way of example, excess temperatures, high temperature shocks or other thermally related overloadings of the at least one measuring tube, high pressure surges in the medium, excessive stresses and/or shaking forces exerted by the process line on the measuring transducer, and, associated therewith, crack formation and/or plastic deformation in the at least one measuring tube, wear brought about by the medium guided in the measuring transducer, for example, internal erosion of the at least one measuring tube brought about by corrosion and/or abrasion, consequently a reducing of the wall thickness of the measuring tube, the forming deposits on the medium-contacting, inside of the at least one measuring tube, material fatigue or other wear phenomena affecting the at least one measuring tube. Moreover, during the lifetime of the measuring system also the at least one oscillation exciter, as well as also each of the oscillation sensors, can, for instance, due to thermally related overloading, or aging, be subjected to changes relevant for the accuracy of measurement, for instance, in such a manner, that, as a result, also an electrical impedance of the measuring transducer is changed. As a result of such loadings, a measuring transducer transfer function, according to which the measuring transducer, activated by the at least one driver signal, ultimately converts the parameters of the medium to be registered, in each case, into the respective oscillation signals, varies in a first not directly detectable- or foreseeable, however, at times, as regards the desired high accuracy of measurement no longer to be neglected, manner, and thus the measuring system, as a whole, no longer works reliably. Additionally, as a result of such overloads, especially also overloads affecting the structural integrity of the measuring transducer as a whole, degradations of the ability of the measuring system to function or under circumstances even damage of the measuring transducer leading to leakage or danger of explosion must be cared for. Such changes relative to the reference state affecting the operational safety of measuring systems of the type being discussed can, especially in the case of toxic and/or easily flammable media, or in the case of gases under high pressure, also have catastrophic consequences for the entire process plant as well as persons located therein. Taking this into consideration, measuring systems of the type being discussed are subjected, usually recurringly, to corresponding reviews, for instance, in the course of measures connected with predictive maintenance, and, when required, for instance, in the case of diagnosed decreased accuracy of measurement, at times, correspondingly recalibrated or replaced.

For the purpose of as early as possible detecting of a deviation of the measuring system exceeding a predetermined measure of tolerance from the reference state earlier ascertained therefor, consequently a diagnosis of errors of the measuring system stemming from the measuring transducer, and, associated therewith, an impending, significant lessening of the accuracy of measurement, or lessening of the operational safety, of measuring systems of the type being discussed, for example, as set forth in US-A 2010/0011882, US-A 2007/0062308, US-A 2007/0113678, WO-A 96/05484, WO-A 99/39164, WO-A 03/021205 or EP-A 816 807, a measuring system is provided, wherein aforementioned changes of such measuring systems are detected by comparing current (i.e. ascertained during operation) oscillatory responses of selected components of the measuring transducer, or system parameters representing said oscillatory responses (for example, a measuring tube stiffness, a number of damping factors, in given cases, also frequency selectively registered, damping factors, ratios of mechanical eigenfrequencies of the at least one measuring tube, or other, predetermined, system parameters describing measuring transducer transfer functions, consequently system parameters characterizing the measuring system, etc., at selected— broadband, or frequency selective, oscillatory excitations, such as, for instance, an abrupt or a continuous, in given cases, also multi-modale, oscillatory excitement of one, or a plurality, of the eigenfrequencies of the at least measuring tube) with measuring transducer transfer functions suitably ascertained therefor earlier in the reference state of the measuring system, or with reference system parameters representing such reference transfer functions, in order, for example, to generate, in the case of exceeding a correspondingly predetermined, threshold value representing a still acceptable measure of tolerance, consequently in the case of diagnosing a defect, a system status report, for example, an alarm, correspondingly signaling this.

Alternatively to such diagnostic method dependent, ultimately, in each case, always on measurements of resonance oscillations of the at least one measuring tube based, consequently depending, in considerable measure, also on media parameters, especially density and viscosity, it is, moreover, additionally provided in US-A 2007/0113678 that a component (not specified in great detail) of the measuring system, for instance, the measuring transducer housing, is excited with a forced oscillation, namely at exactly an oscillation frequency, which lies outside a resonance frequency of said components, in order to ascertain certain—, however, likewise not specified in great detail—characteristics of the measuring system, which are otherwise accessible only difficultly, namely via the observation of eigenfrequencies. Whether or to what extent, or based on which factors therewith finally a deviation ( ) of the measuring system from the reference state would be detected at all and especially, however, also a defective state would actually be diagnosed during operation, is, however, not disclosed.

SUMMARY OF THE INVENTION

An object of the invention is, consequently, to improve measuring systems formed by means of measuring transducers of the vibration-type toward the goal that the occurrence of wear, or aging phenomena of a measuring transducer decreasing measurement accuracy and/or operational safety can be detected as early as possible and reliably, and, in given cases, also signaled—and that this goal be accomplished especially, however, also with the already conventional, consequently established, measuring systems of the type being discussed, including "onboard" oscillation exciters and—sensors, and preferably also without the actual measuring operation needing to be mentionably influenced or even interrupted; this, especially, also largely independently of the medium flowing in the measuring transducer as well as with mostly, in given cases, also exclusive, application of the proven design for such measuring systems, especially also the measuring transducers used therein until now, as well as also while largely maintaining proven technologies and architectures of established transmitter electronics.

For achieving the object, the invention resides in a measuring system for, for example, media flowing in pipelines, which measuring system comprises: a measuring transducer of the vibration-type, through which, during operation, a medium flows, for example, a gas and/or a liquid, a paste or a powder or some other, flowable material, and which serves to produce oscillation signals corresponding to media parameters of the flowing medium, for example, parameters such as mass flow rate, density and/or viscosity; as well as, electrically coupled with the measuring transducer, a transmitter electronics for activating the measuring transducer and for evaluating oscillation signals delivered from the measuring transducer. The measuring transducer includes: At least one measuring tube, for example, a V shaped, U shaped or straight, measuring tube, which extends with a wanted, oscillatory length between an inlet-side, first measuring tube end and an outlet-side, second measuring tube end, which has a plurality of natural oscillation modes and which serves for conveying flowing medium; at least one oscillation exciter, for example, an electrodynamic, oscillation exciter, for converting electrical, excitation power into vibrations of the at least one measuring tube, for example, in such a manner that the at least one measuring tube, at least partially and/or at least at times, executes oscillations about a resting position with an instantaneous eigenfrequency of a natural mode of oscillation of the measuring tube; and at least one oscillation sensor, for example, an electrodynamic, oscillation sensor, for registering vibrations of the at least one measuring tube, for example, inlet-side or outlet-side vibrations, and for producing an oscillation signal of the measuring transducer representing vibrations, for example, inlet-side or outlet-side vibrations, at least of the at least one measuring tube. The transmitter electronics delivers a driver signal for the at least one oscillation exciter. The driver signal serves for feeding electrical, excitation power into the at least one oscillation exciter, consequently for effecting vibrations of the at least one measuring tube, in such a manner that the driver signal has, at least at times, a sinusoidal signal component of first type, for example, a sinusoidal signal component of first type having a plurality of oscillation periods, with a signal frequency, $f_{drv,I}$, which corresponds to an instantaneous eigenfrequency, $f_1$, of a natural mode of oscillation of first order of the at least one measuring tube, in which the at least one measuring tube can execute, and, respectively, executes, eigenoscillations about a resting position, which eigenoscillations have, in the region of the first and second measuring tube ends, in each case, an oscillation node and, in the region of the wanted, oscillatory length exactly one oscillatory antinode, whereby the at least one measuring tube, excited by the at least one oscillation exciter, executes, at least partially, for example, also predominantly, resonance oscillations, namely oscillations with an oscillation frequency, $f_{drv,I}=f_1$, corresponding to the instantaneous eigenfrequency, $f_1$, of the mode of oscillation of first order, and the at least one oscillatory signal has, at least at times, a sinusoidal signal component of first type, for example, a sinusoidal signal component of first type having a plurality of oscillation periods, with a signal frequency, $f_{sens,I}$, which corresponds to the signal frequency, $f_{drv,I}$, of the signal component of first type of the driver signal, consequently the instantaneous eigenfrequency, $f_1$, of the mode of oscillation of first order, and, in such a manner that the driver signal has, at least at times, a sinusoidal signal component of second type, for example, a sinusoidal signal component of second type instantaneously dominating as regards a signal power and/or a sinusoidal signal component of second type having a plurality of oscillation periods, with a signal frequency, $f_{drv,I}$, which deviates from each instantaneous eigenfrequency of each natural mode of oscillation of the at least one measuring tube, in each case, by more than 1 Hz, for example, also by more than 10 Hz, and/or by more than 1%, for example, also more than 10%, of said eigenfrequency, whereby the at least one measuring tube, excited by the at least one oscillation exciter, executes, at least partially, forced oscillations outside of resonance, and the at least one oscillatory signal, at least at times, has a sinusoidal signal component of second type, for example, a sinusoidal signal component of second type having a plurality of oscillation periods, with a signal frequency, $f_{sens,II}$, which corresponds to the signal frequency, $f_{drv,II}$, of the signal component of second type of the driver signal, consequently not an instantaneous eigenfrequency of some natural mode of oscillation of the at least one measuring tube.

According to a first embodiment of the invention, it is additionally provided that the transmitter electronics sets the signal frequency of the signal component of second type of the driver signal as a function of the signal component of first type of the driver signal and/or as a function of the signal component of first type of the oscillation signal, for example, in such a manner that the transmitter electronics sets the signal frequency of the signal component of second type of the driver signal in a predetermined frequency ratio (for example, a frequency ratio already fixedly predetermined by the manufacturer) to the instantaneous eigenfrequency, $f_1$, of the mode of oscillation of first order, or to the instantaneous signal frequency of the signal component of first type of the driver signal. Developing this embodiment of the invention further, it is additionally provided that the transmitter electronics sets the signal frequency of the signal component of second type of the driver signal in a predetermined frequency ratio (for example, a frequency ratio stored in a non-volatile data memory for measured values serving as reference values representing a reference state of the measuring system) to the instantaneous eigenfrequency, $f_1$, of the mode of oscillation of first order, or to the instantaneous signal frequency of the signal component of first type of the driver signal.

According to a second embodiment of the invention, it is additionally provided that the transmitter electronics, by means of the signal component of second type of the at least one oscillation signal, generates a system status report, for example, a system status report in the form of an alarm, which signals, for example, visually and/or acoustically perceivably, a deviation of the measuring system exceeding a predetermined measure of tolerance from a reference state ascertained earlier therefor, for example, in a calibrating and/or at a start-up of the measuring system, for example, a deviation related to aging of the measuring system and/or related to loadings of the measuring transducer irreversibly changing an oscillatory behavior of the at least one measuring tube and/or related to thermal loadings of the measuring transducer changing an electrical impedance and/or an electro-mechanical transducer constant of the at least one oscillation exciter and/or related to thermal loadings of the measuring transducer changing an electrical impedance and/or an electro-mechanical transducer constant of the at least one oscillation sensor.

According to a third embodiment of the invention, it is additionally provided that the transmitter electronics, by means of the signal component of second type of the at least one oscillation signal, generates a system status report, for example, a system status report in the form of an alarm, which signals, for example, visually and/or acoustically perceivably, wear of the measuring tube exceeding a predetermined measure of tolerance. Developing this embodiment of the invention further, it is additionally provided that the deviation signaled by the system status report results from the fact that a deposit has formed on and clings to an inner surface of the measuring tube contacting the medium to be measured during operation and/or that a structural integrity of the at least one measuring tube is no longer assured, for example, as a result of material removal and/or as a result of overloading and/or as a result of crack formation and/or as a result of material fatigue.

According to a fourth embodiment of the invention, it is additionally provided that the transmitter electronics, by means of the signal component of second type of the at least one oscillation signal, generates a system status report, for example, a system status report in the form of an alarm, which signals, for example, visually and/or acoustically perceivably, that structural integrity of the at least one measuring tube is no longer assured, for example, as a result of material removal and/or as a result of overloading and/or as a result of crack formation and/or as a result of material fatigue.

According to a fifth embodiment of the invention, it is additionally provided that the transmitter electronics, by means of the signal component of second type of the at least one oscillation signal, generates a system status report, for example, a system status report in the form of an alarm, which signals, for example, visually and/or acoustically perceivably, that a deposit has formed clinging to an inner surface of the measuring tube contacted by medium to be measured during operation.

According to a sixth embodiment of the invention, it is additionally provided that the transmitter electronics, by means of the signal component of second type of the at least one oscillation signal, generates a system status report, for example, a system status report in the form of an alarm, which signals, for example, visually and/or acoustically perceivably, removal of material of the measuring tube exceeding a predetermined measure of tolerance.

According to a seventh embodiment of the invention, it is additionally provided that the transmitter electronics, by means of the signal component of second type of the at least one oscillation signal, generates a system status report, for example, a system status report in the form of an alarm, which signals, for example, visually and/or acoustically perceivably, crack formation in the at least one measuring tube.

According to an eighth embodiment of the invention, it is additionally provided that the transmitter electronics, by means of the signal component of second type of the at least one oscillation signal, generates a system status report, for example, a system status report in the form of an alarm, which signals a change of the oscillation characteristics of the at least one measuring tube exceeding, for example, as a result of deformation and/or as a result of material removal and/or as a result of crack formation and/or as a result of material fatigue, a predetermined measure of tolerance.

According to a ninth embodiment of the invention, it is additionally provided that the transmitter electronics, by means of the signal component of second type of the at least one oscillation signal, generates a system status report, for example, a system status report in the form of an alarm, which signals a change of an electrical impedance of the measuring transducer exceeding a predetermined measure of tolerance.

According to a tenth embodiment of the invention, it is additionally provided that the transmitter electronics, by means of the signal component of second type of the at least one oscillation signal, generates a system status report, for example, a system status report in the form of an alarm, which signals, for example, visually and/or acoustically perceivably, a change of an electrical impedance, and/or an electro-mechanical transducer constant, of the at least one oscillation exciter, and/or an electrical impedance and/or an electro-mechanical transducer constant of the at least one oscillation sensor, exceeding a predetermined measure of tolerance.

According to an eleventh embodiment of the invention, it is additionally provided that the transmitter electronics, by means of the signal component of second type of the driver signal, for example, based on an electrical current flowing in the at least one oscillation exciter and serving as signal component of second type of the driver signal or based on a voltage driving such and serving as signal component of second type of the driver signal, and by means of the signal component of second type of the at least one oscillation signal, for example, based on a voltage generated by means of the at least one oscillation sensor and serving as signal component of second type of the oscillation signal and/or based on a phase difference of the signal component of second type of the oscillation signal relative to the signal component of second type of the driver signal, detects whether and/or to what extent the measuring system, in comparison to a reference state ascertained therefor earlier, for example, in a calibrating and/or at a start-up of the measuring system, is changed, for example, as a result of aging and/or as a result of loading of the measuring transducer, for example, in such a manner that a system parameter, measured value for at least one system parameter characterizing the measuring system and ascertained during operation of the measuring system, based on the signal component of second type of the driver signal and/or based on the signal component of second type of the at least one oscillation signal, deviates from a system parameter, reference value, ascertained in the reference state of the measuring system for said system parameter, by more than a predetermined measure of tolerance, for example, by more than 0.1% of said reference value.

According to a twelfth embodiment of the invention, it is additionally provided that the driver signal simultaneously contains the signal component of first type and the signal component of second type, whereby the at least one measuring tube, excited by the at least one oscillation exciter, simultaneously executes both partially resonance oscillations, namely with an oscillation frequency, $f_{drv,I}=f_1$, corresponding to the instantaneous eigenfrequency, $f_1$, of the mode of oscillation of first order, as well as also partially forced oscillations outside of resonance.

According to a thirteenth embodiment of the invention, it is additionally provided that the signal frequency, $f_{drv,II}$, of the signal component of second type of the driver signal is greater than 5 Hz, for example, greater than 10 Hz, and/or that the signal frequency, $f_{drv,II}$, of the signal component of second type of the driver signal is greater than 0.1 times the instantaneous eigenfrequency of the mode of oscillation of first order.

According to a fourteenth embodiment of the invention, it is additionally provided that the signal frequency of the signal component of second type of the driver signal corresponds to more than 1.01 times, for example, more than 1.15 times, and less than 2.7 times, for example, less than 2.4 times, an instantaneous eigenfrequency, $f_1$, of the mode of oscillation of first order, whereby the at least one measuring tube, excited by the at least one oscillation exciter, executes, at least partially, forced oscillations outside of resonance with an oscillation frequency lying in a frequency range, $|1.01 \cdot f_1 < f_{drv,II} < 2.7 \cdot f_1|$, i.e. above 1.01 times, for example, above 1.15 times, and below 2.7 times, for example, below 2.4 times, the instantaneous eigenfrequency, $f_1$, of the mode of oscillation of first order, and the signal frequency of the second signal component of the oscillation signal lies above 1.01 times, for example, above 1.15 times, and below 2.7 times, for example, below 2.4 times, the instantaneous eigenfrequency, $f_1$, of the mode of oscillation of first order. Developing this embodiment of the invention further, it is additionally provided that the transmitter electronics stepwise changes the signal frequency of the signal component second type of the driver signal within the frequency range, $|1.01 \cdot f_1 < f_{drv,II} < 2.7 \cdot f_1|$, i.e. above 1.01 times, for example, above 1.15 times, and below 2.7 times, for example, below 2.4 times, the instantaneous eigenfrequency, of the mode of oscillation of first order, for example, in such a manner that the transmitter electronics step-wise increases or step-wise lessens said signal frequency, $f_{drv,II}$, within said frequency range by a predeterminable magnitude, beginning at a starting value predetermined therefor within said frequency range, $|1.01 \cdot f_1 < f_{drv,II} < 2.7 \cdot f_1|$, until reaching an end value predetermined for the signal frequency; and/or that the transmitter electronics continuously changes the signal frequency of the signal component of second type of the driver signal within the frequency range, $|1.01 \cdot f_1 < f_{drv,II} < 2.7 \cdot f_1|$, i.e. above 1.01 times, for example, above 1.15 times, and below 2.7 times, for example, below 2.4 times, the instantaneous eigenfrequency, $f_1$, of the mode of oscillation of first order, for example, in such a manner that the transmitter electronics linearly increases or linearly lessens said signal frequency, beginning at a starting value predetermined therefor within said frequency range, and proceeding to an end value predetermined for the signal frequency within said frequency range, or that the transmitter electronics alternately linearly increases, or linearly lessens, said signal frequency.

According to a fifteenth embodiment of the invention, it is additionally provided that the signal frequency of the signal component of second type of the driver signal is smaller than an instantaneous eigenfrequency, $f_2$, of a mode of oscillation of second order of the at least one measuring tube, in which the at least one vibrating measuring tube can execute, or executes, oscillations about a resting position, which have in the region of the first and second measuring tube ends, in each case, an oscillation node and in the region of the wanted, oscillatory length an additional oscillation node as well as exactly two oscillatory antinodes, whereby the at least one measuring tube, excited by the at least one oscillation exciter executes, at least partially, forced oscillations outside of resonance, namely in a frequency range, $|f_{drv,II} < f_2|$, which lies below the instantaneous eigenfrequency of the mode of oscillation of second order, and the at least one oscillatory signal has, at least at times, a signal component of second type with a signal frequency, which lies below the instantaneous eigenfrequency of the mode of oscillation of second order, for example, in such a manner that the at least one measuring tube, excited by the at least one oscillation exciter executes, at least partially, forced oscillations outside of resonance, namely in a frequency range, $|f_1 < f_{drv,II} < f_2|$, which lies above the instantaneous eigenfrequency, $f_1$, of the mode of oscillation of first order and below the instantaneous eigenfrequency, $f_2$, of the mode of oscillation of second order, and the at least one oscillatory signal has, at least at times, a signal component of second type with a signal frequency, which lies above the instantaneous eigenfrequency of the mode of oscillation of first order and below the instantaneous eigenfrequency of the mode of oscillation of second order. Developing this embodiment of the invention further, it is additionally provided that the signal frequency, $f_{drv,II}$, of the signal component of second type of the driver signal is smaller than 0.95 times the instantaneous eigenfrequency of the mode of oscillation of second order.

According to a sixteenth embodiment of the invention, it is additionally provided that the transmitter electronics, by means of the signal component of first type of the at least one oscillation signal, and/or by means of the signal component of first type of the driver signal, ascertains, for example, recurringly, a media parameter, measured value representing a parameter to be measured for the flowing medium, for example, mass flow rate, density and/or viscosity.

According to a seventeenth embodiment of the invention, it is additionally provided that the signal frequency of the signal component of first type of the driver signal corresponds to an instantaneous eigenfrequency of a natural bending oscillation mode, in which the at least one vibrating measuring tube executes bending oscillations about the resting position, wherein the bending oscillations have, in the region of the first and second measuring tube ends, in each case, an oscillation node and in the region of the wanted, oscillatory length exactly one oscillatory antinode (thus, this is the bending oscillation, fundamental mode), whereby the at least one measuring tube, excited by the at least one oscillation exciter, executes, at least partially, for example, predominantly, bending resonance oscillations, namely oscillations with an oscillation frequency corresponding to the instantaneous eigenfrequency of said bending oscillation mode, and the signal frequency of the signal component of first type of the at least one oscillation signal corresponds to the instantaneous eigenfrequency of said bending oscillation mode.

According to an eighteenth embodiment of the invention, it is additionally provided that the at least one measuring tube is straight.

According to a nineteenth embodiment of the invention, it is additionally provided that the at least one measuring tube is straight, and that the signal frequency of the signal component of first type of the driver signal corresponds to an instantaneous eigenfrequency of a natural torsional oscillation mode, in which the at least one vibrating measuring tube executes torsional oscillations about the resting position, namely, torsional oscillations about an imaginary oscillation axis imaginarily connecting the inlet-side, first measuring tube end and the outlet-side, second measuring tube end, which torsional oscillations have in the regions of the first and second measuring tube ends, in each case, an oscillation node and in the region of the wanted, oscillatory length exactly one oscillatory antinode (thus, this is the torsional oscillation, fundamental mode), whereby the at least one measuring tube, excited by the at least one oscillation exciter, executes, at least partially, for example, predominantly, torsional, resonance oscillations, namely oscillations with an oscillation frequency corresponding to the instantaneous eigenfrequency of said torsional oscillation mode, and the signal frequency of the signal component of first type of the at least one oscillation signal corresponds to the instantaneous eigenfrequency of said torsional oscillation mode.

According to a twentieth embodiment of the invention, it is additionally provided that the measuring transducer has at least two measuring tubes mechanically coupled with one another for conveying flowing medium, for example, equally constructed measuring tubes and/or measuring tubes extending at least sectionally parallel relative to one another, of which each extends between a respective inlet-side, first measuring tube end and a respective outlet-side, second measuring tube end with a wanted, oscillatory length and of which each has, in each case, a natural mode of oscillation of first order, in which it can execute, or executes, eigenoscillations about its resting position, which eigenoscillations have in the region of the respective first and second measuring tube ends, in each case, an oscillation node and in the region of the wanted, oscillatory length exactly one oscillatory antinode, and which eigenoscillations, in each case, have an eigenfrequency, $f_1$, which equals the eigenfrequency, $f_1$, of the natural mode of oscillation of first order of the, in each case, other measuring tube. Developing this embodiment of the invention further, it is additionally provided that the at least one oscillation exciter, for example, an oscillation exciter acting differentially between the at least two measuring tubes, serves for converting electrical, excitation power into vibrations of each of the at least two measuring tubes, for example, in such a manner that each of the at least two measuring tubes executes, simultaneously, at least partially, oscillations about a resting position with an instantaneous eigenfrequency of an natural mode of oscillation inherent to it, and that the signal frequency, $f_{drv,I}$, of the signal component of first type of the driver signal corresponds to an instantaneous eigenfrequency, $f_1$, of the natural mode of oscillation of first order of each of the at least two measuring tubes, whereby each of the at least two measuring tubes, excited by the at least one oscillation exciter, executes, at least partially, for example, predominantly, resonance oscillations, namely oscillations with an oscillation frequency, $f_{exc,I} = f_1$, corresponding to the instantaneous eigenfrequency, $f_1$, of the mode of oscillation of first order, for example, in such a manner that the oscillations of the at least two measuring tubes are opposite equal relative to one another.

According to a twenty-first embodiment of the invention, it is additionally provided that the measuring transducer has four measuring tubes mechanically coupled with one another for conveying flowing medium, for example, measuring tubes, which are equally constructed and/or extending at least pairwise sectionally parallel relative to one another.

According to a first further development of the invention, it is additionally provided that the transmitter electronics, by means of the signal component of second type of the at least one oscillation signal, as well as by means of the signal component of second type of the driver signal, ascertains, for example, recurringly, a system parameter, measured value for a system parameter characterizing a measuring transducer transfer function inherent to the measuring transducer and, consequently, characterizing also the measuring system, according to which measuring transducer transfer function the driver signal or an individual signal component thereof, for example, an electrical current flowing in the at least one oscillation exciter and serving as signal component of second type of the driver signal or a voltage driving such and serving as signal component of second type of the driver signal, is converted into the at least one oscillatory signal or individual signal components thereof, for example, a voltage generated by means of the at least one oscillation sensor and serving as signal component of second type of the oscillation signal.

According to a first embodiment of the first further development of the invention, it is additionally provided that said system parameter corresponds to a ratio (for example, a complex ratio having a real- and an imaginary part) of a voltage generated by means of the at least one oscillation sensor and serving as signal component of second type of the oscillation signal, to an electrical current flowing in the at least one oscillation exciter and serving as signal component of second type of the driver signal.

According to a second embodiment of the first further development of the invention, it is additionally provided that the system parameter, measured value for said system parameter represents a ratio of a voltage generated by means of the at least one oscillation sensor and serving as signal component of second type of the oscillation signal, to an electrical current flowing in the at least one oscillation exciter and serving as signal component of second type of the driver signal.

According to a third embodiment of the first further development of the invention, it is additionally provided that said system parameter corresponds to a ratio (for example, a complex ratio having a real- and an imaginary part) of a voltage generated by means of the at least one oscillation sensor and serving as signal component of second type of the oscillation signal, to a voltage driving an electrical current flowing in the at least one oscillation exciter and serving as signal component of second type of the driver signal.

According to a fourth embodiment of the first further development of the invention, it is additionally provided that the system parameter, measured value for said system parameter represents a ratio of a voltage generated by means of the at least one oscillation sensor and serving as signal component of second type of the oscillation signal, to a voltage driving an electrical current flowing in the at least one oscillation exciter and serving as signal component of second type of the driver signal, or is ascertained by the transmitter electronics based on said amplitude ratio.

According to a fifth embodiment of the first further development of the invention, it is additionally provided that the system parameter, measured value for said system parameter represents a phase difference between a voltage generated by means of the at least one oscillation sensor and serving as signal component of second type of the oscillation signal, and an electrical current flowing in the at least one oscillation exciter and serving as signal component of second type of the driver signal.

According to a sixth embodiment of the first further development of the invention, it is additionally provided that the system parameter, measured value for said system parameter represents a phase difference between, on the one hand, a voltage generated by means of the at least one oscillation sensor and serving as signal component of second type of the oscillation signal, and, on the other hand, a voltage driving the electrical current flowing in the at least one oscillation exciter and serving as signal component of second type of the driver signal.

According to a seventh embodiment of the first further development of the invention, it is additionally provided that the transmitter electronics ascertains the system parameter, measured value for said system parameter based on a ratio of the signal frequency of the signal component of second type of the driver signal to the signal frequency of the signal component of first type of the driver signal.

According to an eighth embodiment of the first further development of the invention, it is additionally provided that the system parameter, measured value for said system parameter represents a ratio of an amplitude of a voltage generated by means of the at least one oscillation sensor and serving as signal component of second type of the oscillation signal, to an amplitude of a voltage driving the electrical current flowing in the at least one oscillation exciter and serving as signal component of second type of the driver signal, or is based on said ratio ascertained by the transmitter electronics.

According to a ninth embodiment of the first further development of the invention, it is additionally provided that the system parameter, measured value for said system parameter represents a ratio of an amplitude of a voltage generated by means of the at least one oscillation sensor and serving as signal component of second type of the oscillation signal, to an amplitude of a voltage driving the electrical current flowing in the at least one oscillation exciter and serving as signal component of second type of the driver signal, multiplied by a parameter measured value representing an electrical impedance, $Z_{drv,II}$, of the at least one oscillation exciter effective for the signal component of second type of the driver signal, or is based on said ratio ascertained by the transmitter electronics.

According to a tenth embodiment of the first further development of the invention, it is additionally provided that the system parameter, measured value for said system parameter represents a ratio of an amplitude of a voltage generated by means of the at least one oscillation sensor and serving as signal component of second type of the oscillation signal, to an amplitude of an electrical current flowing in the at least one oscillation exciter and serving as signal component of second type of the driver signal, or is based on said ratio ascertained by the transmitter electronics.

According to an eleventh embodiment of the first further development of the invention, it is additionally provided that the transmitter electronics ascertains the system parameter, measured value for said system parameter based on a ratio of the signal frequency of the signal component of second type of the driver signal to the signal frequency of the signal component of first type of the driver signal as well as a ratio of an amplitude of a voltage generated by means of the at least one oscillation sensor and serving as signal component of second type of the oscillation signal, to an amplitude of a voltage driving the electrical current flowing in the at least one oscillation exciter and serving as signal component of second type of the driver signal.

According to a twelfth embodiment of the first further development of the invention, it is additionally provided that the transmitter electronics ascertains the system parameter, measured value for said system parameter based on a ratio of the signal frequency of the signal component of second type of the driver signal to the signal frequency of the signal component of first type of the driver signal as well as a ratio of an amplitude of a voltage generated by means of the at least one oscillation sensor and serving as signal component of second type of the oscillation signal, to an amplitude of an electrical current flowing in the at least one oscillation exciter and serving as signal component of second type of the driver signal.

According to a thirteenth embodiment of the first further development of the invention, it is additionally provided that the transmitter electronics, by means of said system parameter characterizing the measuring transducer transfer function, detects whether and/or to what extent the measuring system, in comparison to a reference state ascertained earlier therefor, for example, in a calibrating and/or at a start-up of the measuring system, has changed, for example, as a result of aging and/or as a result of loading of the measuring transducer, for example, in such a manner, that the transmitter electronics, by means of said system parameter characterizing the measuring transducer transfer function, in given cases, generates a system status report, for example, in the form of an alarm, which signals a deviation of the measuring system exceeding a predetermined measure of tolerance from a therefor earlier ascertained, reference state.

According to a fourteenth embodiment of the first further development of the invention, it is additionally provided that the transmitter electronics, by means of the signal component of first type of the at least one oscillation signal, and/or by means of the signal component of first type of the driver signal, ascertains, for example, recurringly, a media parameter, measured value representing a parameter to be measured for the flowing medium, for example, mass flow rate, density and/or viscosity.

According to a fifteenth embodiment of the first further development of the invention, it is additionally provided that the transmitter electronics, by means of the signal component of second type of the at least one oscillation signal, as well as by means of the signal component of second type of the driver signal, ascertains, for example, recurringly, a system parameter, measured value for a system parameter characterizing a measuring transducer transfer function inherent to the measuring transducer and, consequently, characterizing also the measuring system, according to which measuring transducer transfer function the driver signal or individual signal components thereof, for example, an electrical current flowing in the at least one oscillation exciter and serving as signal component of second type of the driver signal or a voltage driving such and serving as signal component of second type of the driver signal, is converted into the at least one oscillatory signal or individual signal components thereof, for example, a voltage generated by means of the at least one oscillation sensor and serving as signal component of second type of the oscillation signal, and that the transmitter electronics ascertains the at least one media parameter, measured value with application also of the system parameter, measured value, for example, in such a manner that the transmitter electronics compensates an influence of a deviation of the measuring system, as ascertained with application of the system parameter, measured value, from a reference state ascertained therefor earlier, on an accuracy of measurement of the measuring system, with which media parameter, measured values are ascertained.

According to a second further development of the invention, it is additionally provided that the transmitter electronics has a data memory, for example, a volatile data memory, for measured values produced by means of the measuring system, in which data memory is held, as formed by means of measured values produced during operation of the measuring system and representing, for example, temporarily, an operating state of the measuring system, at least one measured data set, which comprises system parameter, measured values for different system parameters characterizing the measuring system and produced based on the signal component of second type of the driver signal and/or based on the signal component of second type of the at least one sensor signal.

According to a first embodiment of the second further development of the invention, it is additionally provided that the measured data set comprises a system parameter, measured value for the signal component of second type of the driver signal supplied to the at least one oscillation exciter during operation of the measuring system and/or a system parameter, measured value for the signal component of second type of the at least one oscillation signal delivered by the measuring transducer during operation of the measuring system and/or a system parameter, measured value derived from the signal component of second type of the driver signal supplied to the exciter mechanism during operation of the measuring system and derived from the signal component of second type of the at least one oscillation signal delivered from the measuring transducer during operation of the measuring system.

According to a second embodiment of the second further development of the invention, it is additionally provided that, in the data memory for measured values produced by means of the measuring system, a measured data set formed by means of measured values produced during operation of the measuring system is held representing medium conveyed in the measuring transducer, wherein the data set comprises media parameter, measured values, produced based on the signal component of first type of the driver signal and/or based on the signal component of first type of the at least one sensor signal, for different parameters, for example, mass flow rate, density and/or viscosity, characterizing the flowing medium.

According to a third further development of the invention, it is additionally provided that the transmitter electronics has a data memory, for example, a non-volatile, data memory, for measured values serving as reference values representing a reference state of the measuring system, in which data memory at least one reference data set representing a reference state of the measuring system, for example, a measuring system already installed in a pipeline, is held and comprises, for example, system parameter, reference values for different system parameters, namely system parameters characterizing the measuring system, produced by means of the same in the course of a calibrating of the measuring system in the plant of the manufacturer and/or during a start-up of the measuring system, for example, in such a manner that said system parameter, reference values are measured values produced by means of the measuring system itself located in the reference state and/or by means of measuring transducer conveying medium of known temperature.

According to a first embodiment of the third further development of the invention, it is additionally provided that the reference data set comprises a system parameter, reference value for a signal component of second type of the driver signal supplied to the at least one oscillation exciter when the measuring system is in the reference state and/or a system parameter, reference value for a signal component of second type of the at least one oscillation signal delivered by the measuring transducer when the measuring system is in the reference state and/or a system parameter, reference value derived from a signal component of second type of the driver signal supplied to the exciter mechanism when the measuring system is in the reference state and from a signal component of second type of the at least one oscillatory signal delivered by the measuring transducer when the measuring system is in the reference state.

According to a second embodiment of the third further development of the invention, it is additionally provided that the transmitter electronics, by means of the signal component of second type of the at least one oscillation signal, as well as by means of the signal component of second type of the driver signal, ascertains, for example, recurringly, a system parameter, measured value for a system parameter characterizing a measuring transducer transfer function inherent to the measuring transducer and thus characterizing also the measuring system, according to which measuring transducer transfer function the driver signal or individual signal components thereof, for example, an electrical current flowing in the at least one oscillation exciter and serving as signal component of second type of the driver signal or a voltage driving such and serving as signal component of second type of the driver signal ($s_{drv}$), is converted into the at least one oscillatory signal or individual signal components thereof, for example, a voltage generated by means of the at least one oscillation sensor and serving as signal component of second type of the oscillation signal, and that the reference data set comprises a system parameter, reference value for the system parameter characterizing the measuring transducer transfer function, wherein the system parameter, reference value is ascertained, for example, by means of the measuring system itself located in the reference state and/or by means of the measuring transducer conveying medium of known temperature, and represents the measuring transducer transfer function of the measuring system located in the reference state.

According to a third embodiment of the third further development of the invention, it is additionally provided that the reference data set comprises a system parameter, reference value representing the eigenfrequency, $f_1$, of the mode of oscillation of first order when the measuring system is in the reference state as well as a system parameter, reference value representing the signal frequency of the signal component of second type of the driver signal supplied to the at least one oscillation exciter when the measuring system is in the reference state.

According to a fourth embodiment of the third further development of the invention, it is additionally provided that the reference data set comprises a system parameter, reference value representing a ratio of the signal frequency of the signal component of second type of the driver signal supplied to the at least one oscillation exciter, when the measuring system is in the reference state, to the eigenfrequency, $f_1$, of the mode of oscillation of first order when the measuring system is in the reference state.

According to a fourth further development of the invention, it is additionally provided that the transmitter electronics, by means of the signal component of second type of the at least one oscillation signal, as well as by means of the signal component of second type of the driver signal, ascertains, for example, recurringly, a system parameter, measured value for a system parameter characterizing a measuring transducer transfer function inherent to the measuring transducer and, consequently, characterizing also the measuring system, according to which measuring transducer transfer function the driver signal or individual signal components thereof, for example, an electrical current flowing in the at least one oscillation exciter and serving as signal component of second type of the driver signal, or a voltage driving such and serving as signal component of second type of the driver signal ($s_{drv}$), are converted into the at least one oscillatory signal or individual signal components thereof, for example, a voltage generated by means of the at least one oscillation sensor and serving as signal component of second type of the oscillation signal, and that the reference data set comprises a system parameter, reference value for the system parameter characterizing the measuring transducer transfer function, for example, a system parameter, reference value ascertained by means of the measuring system itself located in the reference state and/or by means of the measuring transducer conveying medium of known temperature, and representing the measuring transducer transfer function of the measuring system located in the reference state.

According to a first embodiment of the fourth further development of the invention, it is additionally provided that the system parameter, reference value for said system parameter represents a ratio of a voltage generated by means of the at least one oscillation sensor when the measuring system is in the reference state and serving as signal component of second type of the oscillation signal, to a voltage driving an electrical current flowing in the at least one oscillation exciter when the measuring system is in the reference state and serving as signal component of second type of the driver signal.

According to a second embodiment of the fourth further development of the invention, it is additionally provided that the system parameter, measured value for said system parameter represents a ratio of a voltage, which is generated by means of the at least one oscillation sensor when the measuring system is in the reference state and which serves as signal component of second type of the oscillation signal, to a voltage, which drives an electrical current flowing in the at least one oscillation exciter when the measuring system is in the reference state and which serves as signal component of second type of the driver signal.

According to a third embodiment of the fourth further development of the invention, it is additionally provided that the system parameter, measured value for said system parameter represents a phase difference between a voltage, which is generated by means of the at least one oscillation sensor when the measuring system is in the reference state, and which serves as signal component of second type of the oscillation signal, and a voltage, which drives the electrical current flowing in the at least one oscillation exciter when the measuring system is in the reference state, and which serves as signal component of second type of the driver signal.

According to a fourth embodiment of the fourth further development of the invention, it is additionally provided that the system parameter, measured value for said system parameter represents a ratio of an amplitude of a voltage, which is generated by means of the at least one oscillation sensor when the measuring system is in the reference state, and which serves as signal component of second type of the oscillation signal, to an amplitude of a voltage, which drives an electrical current flowing in the at least one oscillation exciter when the measuring system is in the reference state and which serves as signal component of second type of the driver signal.

According to a fifth further development of the invention, it is additionally provided that the transmitter electronics has a data memory, for example, a volatile, data memory, for measured values produced by means of the measuring system, in which data memory at least one measured data set formed by means of measured values produced during operation of the measuring system is held for representing, for example, temporarily, an operating state of the measuring system, wherein the data set comprises system parameter, measured values produced based on the signal component of second type of the driver signal and/or based on the signal component of second type of the at least one sensor signal for different, system parameters characterizing the measuring system, and that the transmitter electronics has a data memory, for example, a non-volatile, data memory, for measured values serving as reference values representing a reference state of the measuring system, in which data memory at least one reference data set is held representing a reference state of the measuring system, for example, a measuring system already installed in a pipeline, wherein the data set comprises system parameter, reference values, for example, system parameter, reference values produced by means of the measuring system in the course of a calibrating of the measuring system in the plant of the manufacturer and/or during a start-up of the measuring system, for different system parameters, namely system parameters characterizing the measuring system, for example, in such a manner that said system parameter, reference values are measured values produced by means of the measuring system itself located in the reference state and/or by means of the measuring transducer conveying medium of known temperature.

According to a first embodiment of the fifth further development of the invention, it is additionally provided that the transmitter electronics, based on the reference data set and the measured data set, for example, based on a deviation, $\Delta G_{ME}$, ascertained between reference data set and measured data set, detects, whether and/or to what extent the measuring system has changed in comparison to the reference state ascertained earlier therefor, and/or that the transmitter electronics, based on a deviation, $\Delta G_{ME}$, ascertained between reference data set and measured data set, detects whether and/or to what extent the measuring system has changed in comparison to the reference state ascertained earlier therefor, for example, in such a manner that the transmitter electronics compares, for example, recurringly, the reference data set with the measured data set.

According to a second embodiment of the fifth further development of the invention, it is additionally provided that the transmitter electronics compares, for example, recurringly, the reference data set with the measured data set by determining a deviation, $\Delta G_{ME}$, of at least one of the system parameter, measured values forming the measured data set from a corresponding, system parameter, reference value, namely that representing the same system parameter, for example, in such a manner that the transmitter electronics ascertains a difference between said system parameter, measured value and the corresponding system parameter, reference value, and/or that the transmitter electronics ascertains a ratio of said system parameter, measured value and the corresponding system parameter, reference value.

According to a third embodiment of the fifth further development of the invention, it is additionally provided that the transmitter electronics, based on a comparison of reference- and measured data sets, generates a system status report, for example, a system status report issued in the form of an alarm, which signals a deviation of the measuring system from a reference state ascertained earlier therefor, for example, in a calibrating and/or at a start-up of the measuring system, related, for example, to aging of the measuring system and/or related to loadings of the measuring transducer irreversibly changing an oscillatory behavior of the at least one measuring tube.

According to a fourth embodiment of the fifth further development of the invention, it is additionally provided that the transmitter electronics, based on the ascertained deviation, $\Delta G_{ME}$, between the at least one system parameter, measured value and the corresponding system parameter, reference value, generates a system status report, for example, a system status report issued in the form of an alarm, which signals a deviation of the measuring system from the reference state earlier ascertained therefor in an amount exceeding a predetermined measure of tolerance and related, for example, to aging of the measuring system and/or to loadings of the measuring transducer irreversibly changing an oscillatory behavior of the at least one measuring tube and/or to thermal loadings of the measuring transducer changing an electrical impedance and/or an electromechanical transducer constant of the at least one oscillation exciter and/or to thermal loadings of the measuring transducer changing an electrical impedance and/or an electromechanical transducer constant of the at least one oscillation sensor.

According to a fifth embodiment of the fifth further development of the invention, it is additionally provided that the transmitter electronics, based on the ascertained deviation, $\Delta G_{ME}$, between the at least one system parameter, measured value and the corresponding system parameter, reference value, generates a system status report, for example, a system status report issued in the form of an alarm, to the extent that the ascertained deviation, $\Delta G_{ME}$, exceeds a threshold value representing a measure of tolerance predetermined therefor, for example, in such a manner that the ascertained deviation, $\Delta G_{ME}$, amounts to more than 0.1% of the associated system parameter, reference value, wherein the status report signals, for example visually and/or acoustically perceivably, a deviation of the measuring system exceeding a predetermined measure of tolerance from the reference state earlier ascertained therefor and related, for example, to aging of the measuring system and/or to loadings of the measuring transducer irreversibly changing an oscillatory behavior of the at least one measuring tube and/or to thermal loadings of the measuring transducer changing an electrical impedance and/or an electromechanical transducer constant of the at least one oscillation exciter and/or to thermal loadings of the measuring transducer changing an electrical impedance and/or an electromechanical transducer constant of the at least one oscillation sensor.

A basic idea of the invention is that, based on oscillations of the at least one measuring tube actively excited outside of resonance, insofar, thus forced oscillations, which are additional to the oscillations of the at least one measuring tube excited in any event in the wanted mode in resonance in the case of measuring systems of the type being discussed, and, respectively, based on some few system parameters easily derivable from the oscillation excitation, namely from the driver signal, and/or the oscillatory response, namely the at least one oscillatory signal, such as, for instance, system parameters such as signal frequencies, signal amplitudes, phase differences (phase angles) of the at least one oscillation signal relative to the driver signal or therefrom derived, complex factors, to perform a review of the measuring system as regards its actual accuracy of measurement, or operational safety and to detect impending, or possibly present, defects early and to diagnose such as exactly as possible. The invention is based, in such case, on the surprising discovery that actually also in the case of active exciting of the at least one measuring tube to oscillations in a selected frequency range, namely a frequency range no longer mentionably influenced by variations of an oscillation quality factor, or by a damping mass, consequently a frequency range outside of the resonance frequencies of the at least one measuring tube, review, or diagnosis, of the measuring system largely independent of the medium guided in the measuring transducer and, respectively, the parameters of the medium to be registered therefor, can alone occur based on the driver—, or oscillation signals notoriously present in measuring systems of the type being discussed, with such signals needing to be, in comparison to conventional measuring systems, only easily modified, and, equally as well, being very easily generatable; this in the case of electrical power available for the exciting in sufficient measure and even also simultaneously for the actual measuring operation.

An advantage the invention is, in such case, especially also that for implementing the oscillation measurement of the invention, or the thereon finally based review, or diagnosis, of the measuring system, both operationally proven, conventional measuring transducers, especially also the therein usually installed, electrodynamic oscillation exciter, or—sensors, as well as also operationally proven conventional transmitter electronics can be used, correspondingly expanded, of course, by the software required for the review, or diagnosis.

BRIEF DESCRIPTION OF THE DRAWINGS

The invention as well as other advantageous embodiments thereof will now be explained in greater detail based on examples of embodiments presented in the figures of the drawing. Equal parts are provided in all figures with equal reference characters; when required for perspicuity or when it otherwise appears sensible, already mentioned reference characters are omitted in subsequent figures. Other advantageous embodiments or further developments, especially also combinations of first only individually explained aspects of the invention, will become evident additionally from the figures of the drawing, as well as also alone the dependent claims. The figures of the drawing show as follows:

FIG. 1a, FIG. 1b shows in different side views, a variant of a measuring system embodied as a compact measuring device for media flowing in pipelines;

FIG. 2a, FIG. 2b in different side views, another variant of a measuring system embodied as a compact measuring device for media flowing in pipelines;

DETAILED DISCUSSION IN CONJUNCTION WITH THE DRAWINGS

Figure 3:
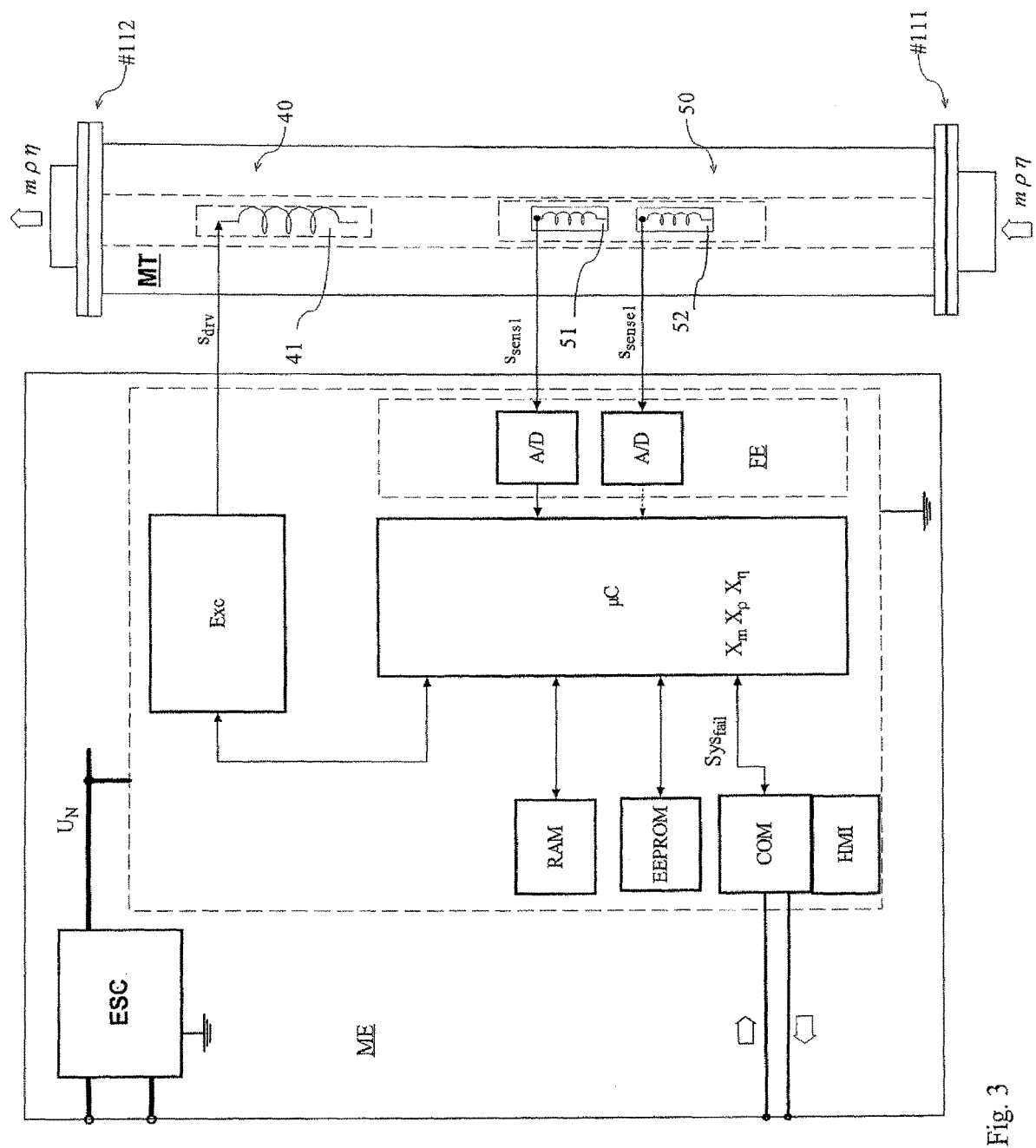
FIG. 3 shows schematically in the manner of a block diagram, a transmitter electronics, especially one suitable for a measuring system according to FIGS. 1a, 1b, 2a, 2b, with measuring transducer of vibration-type connected thereto.

FIGS. 1a, 1b, and, respectively, 2a, 2b show, in each case, a variant of a measuring system insertable into a process line, for instance, a pipeline of an industrial plant, for example, a measuring system formed by means of a Coriolis, mass flow measuring device, density measuring device, viscosity measuring device or the like, for flowable, especially fluid, media. The measuring system serves, especially, for measuring and/or monitoring parameters, such as, for instance, mass flow rate, density, viscosity, etc., characterizing a medium flowing in the process line The measuring system—here implemented by means of an in-line measuring device of compact construction—comprises therefor, a measuring transducer MT of vibration-type connected, via an inlet end #111 as well as an outlet end #112, to the process line. During operation, medium to be measured, such as, for instance, a low viscosity liquid and/or a high viscosity paste and/or a gas, flows through the measuring transducer. The measuring system additionally comprises, connected to the measuring transducer and supplied, especially during operation, externally via connecting cable and/or by means of internal energy storer, with electrical energy, a transmitter electronics ME serving for activating the measuring transducer and for evaluating oscillation signals delivered from the measuring transducer. The transmitter electronics includes, as presented schematically in FIG. 3 in the manner of a block diagram: A driver circuit Exc serving for activating the measuring transducer; and, for processing oscillation signals of the measuring transducer MT, and formed, for example, by means of a microcomputer, and/or communicating during operation with the driver circuit Exc, a measuring, and evaluating, circuit μC, which during operation delivers measured values representing the at least one measured variable, such as e.g. the instantaneous, or a totalled, mass flow. The driver circuit Exc and the evaluating circuit μC, as well as other electronics components of the transmitter electronics serving for the operation of the measuring system, such as, for instance, an internal energy supply circuit ESC providing internal supply voltages $U_I$ and/or a communication circuit COM for connection to a superordinated, measurement data processing system and/or to a fieldbus, are additionally accommodated in a corresponding electronics housing 200, especially an impact- and/or also explosion resistant and/or hermetically sealed, electronics housing.

For visualizing measuring system internally produced, measured values and/or, in given cases, measuring system internally generated, system status reports, such as, for instance, an error report or an alarm, on-site, the measuring system can have, furthermore, a display- and operating element HMI communicating, at least at times, with the transmitter electronics, such as, for instance, an LCD-, OLED- or TFT display placed in the electronics housing behind a window provided therein, as well as an input keypad and/or a touch screen. In advantageous manner, the transmitter electronics ME, especially a programmable and/or remotely parameterable, transmitter electronics, can additionally be so designed that, during operation of the measuring system, it can exchange, via a data transmission system, for example, a fieldbus system and/or wirelessly via radio, measuring- and/or other operating data (such as, for instance, current measuring- and/or system diagnosis values or tuning values serving for the control of the measuring system) with an electronic data processing system superordinated thereto, for example, a programmable logic controller (PLC), a personal computer and/or a work station. For the case, in which the measuring system is to be coupled to a fieldbus- or other communication system, the transmitter electronics ME includes a communication interface COM serving for data communication and embodied according to one of the relevant industry standards. Moreover, the transmitter electronics ME can have, for example, an internal energy supply circuit ESC, which is fed during operation via the aforementioned fieldbus system from an external energy supply provided in the aforementioned data processing system. In an embodiment of the invention, the transmitter electronics is additionally so embodied that it is electrically connectable by means of a two-wire connection 2L, for example, one configured as a 4 to 20 mA current loop, with the external electronic data processing system and can thereby be supplied with electrical energy as well as transmit measured values to the data processing system; the measuring system can, however, also be embodied, for example, as a so-called four-conductor measuring device, in the case of which the internal energy supply circuit ESC of the transmitter electronics ME is connected by means of a first pair of lines with an external energy supply and the internal communication circuit COM of the transmitter electronics ME by means of a second pair of lines with an external data processing circuit or an external data transmission system.

The electrical connecting of the measuring transducer to the transmitter electronics can occur by means of corresponding connecting lines, which lead from the electronics housing 200, for example, via cable feed-through, out and at least sectionally run within the measuring transducer housing. The connecting lines can be embodied, in such case, at least partially, as electrical line wires encased, at least sectionally, in electrical insulation, e.g. in the form of "twisted pair"-lines, flat ribbon cables and/or coaxial cables. Alternatively thereto or in supplementation thereof, the connecting lines can, at least sectionally, also be formed by means of conductive traces of a circuit board, especially a flexible circuit board, which is, in given cases, lacquered; compare, for this, also the initially mentioned U.S. Pat. No. 6,711,958 or 5,349,872.

In FIGS. 4 and 5, or 6 and 7, respectively, first and second examples of embodiments of measuring transducers MT of vibration-type suited for implementing the measuring system are schematically presented for additional explanation of the invention. The measuring transducer MT serves generally for producing in a medium flowing through it, for instance, a gas and/or a liquid, mechanical reaction forces, e.g. mass flow dependent, Coriolis-forces, density dependent, inertial forces and/or viscosity dependent, frictional forces, which react measurably, especially registerably by sensor, on the measuring transducer. Derived from these reaction forces, e.g. a mass flow m, a density $\rho$ and/or a viscosity $\eta$ of the medium can be measured. Each of the measuring transducers comprises therefor, in each case, an inner part, which is arranged in a measuring transducer housing 100 and actually effects the physical to electrical converting of the at least one parameter to be measured, insofar, thus serving as a measuring apparatus. Additionally to accommodating the inner part, the measuring transducer housing 100 can additionally also serve to hold the electronics housing 200 of the in-line measuring device with the therein accommodated driver- and evaluating circuit.

Figure 4:
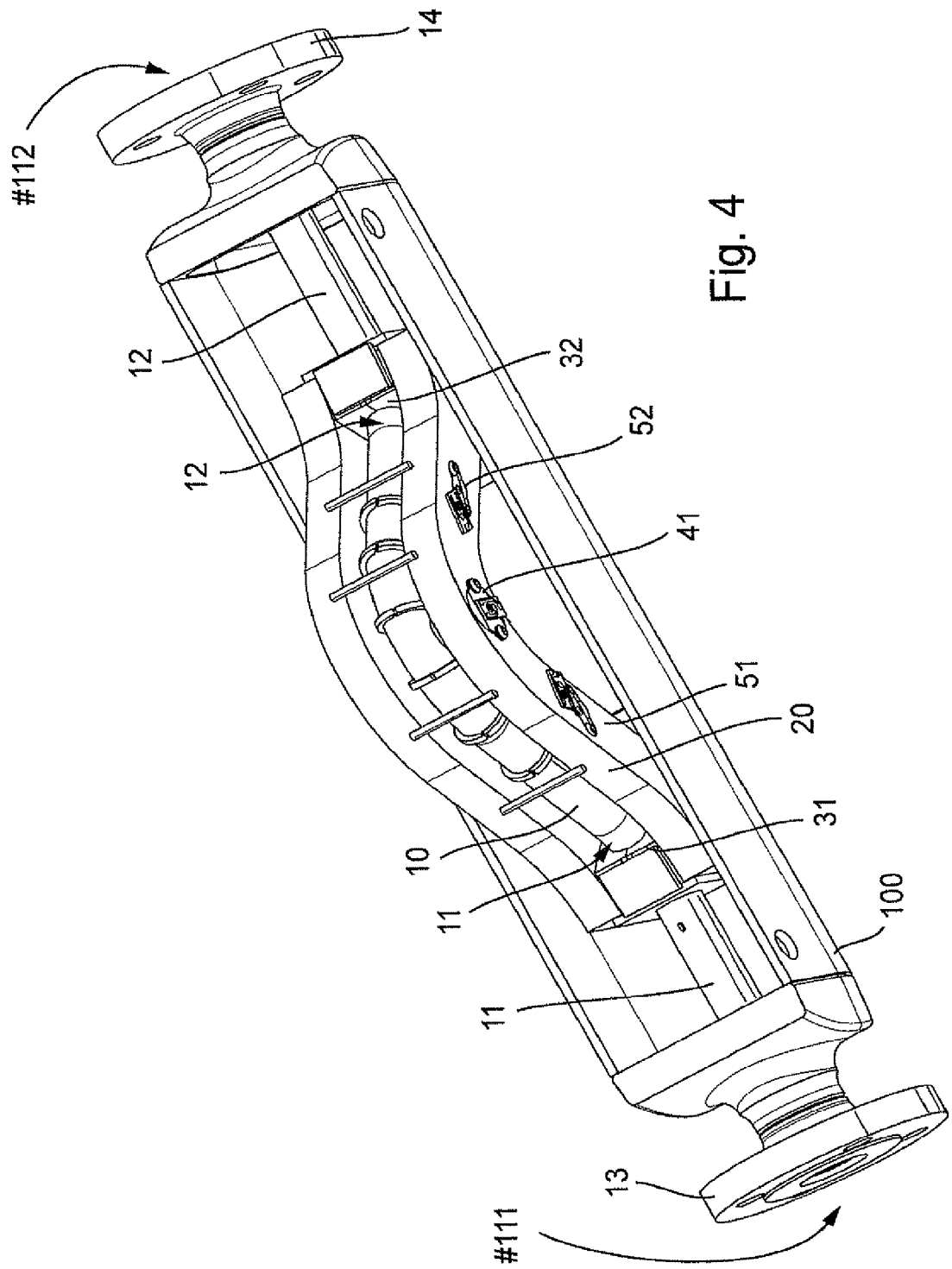
FIG. 4, FIG. 5 shows in partially sectioned and perspective views, a variant of a measuring transducer of vibration-type, especially one suited for a measuring system according to FIGS. 1a, 1b, with a measuring tube vibrating during operation.
Figure 5:
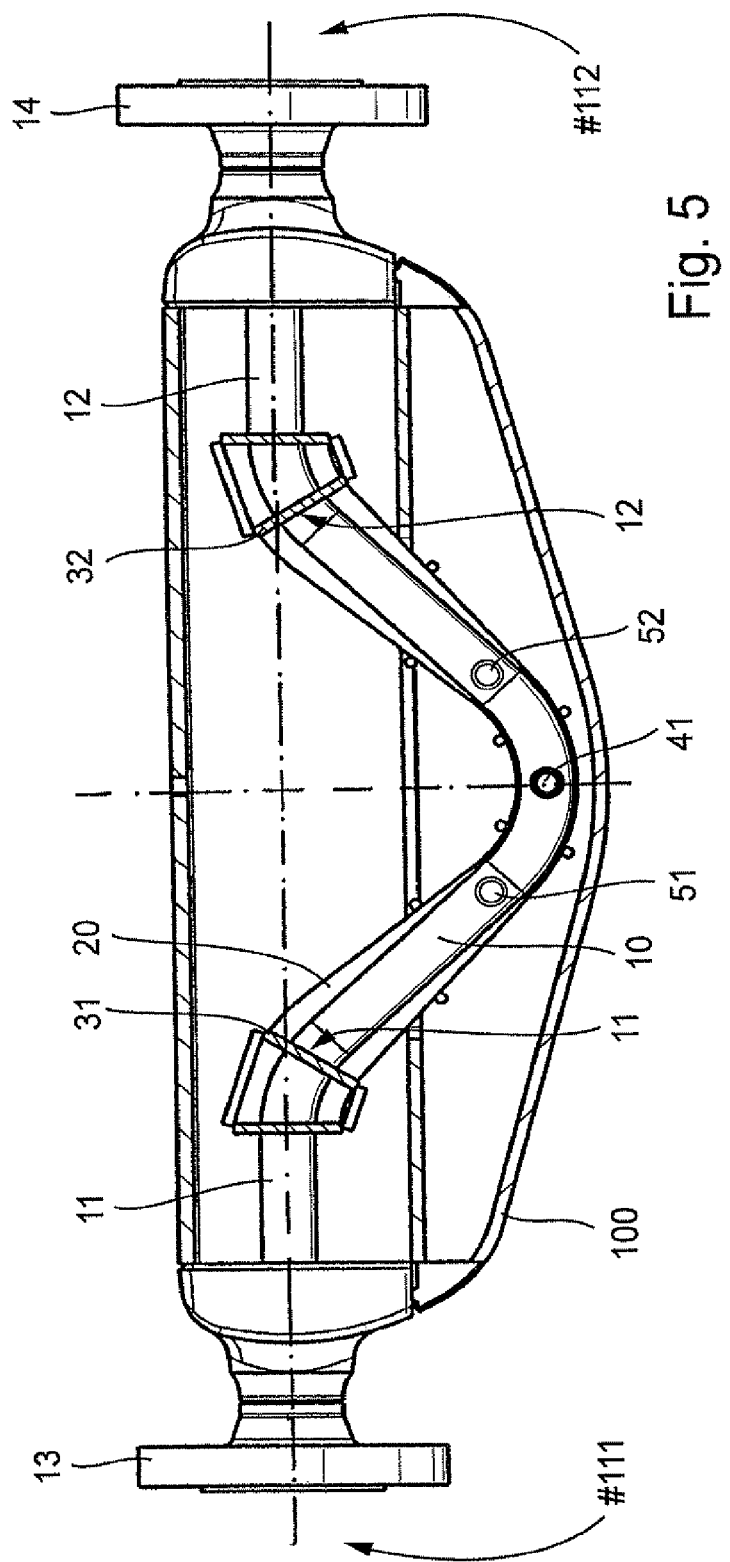
Figure 6:
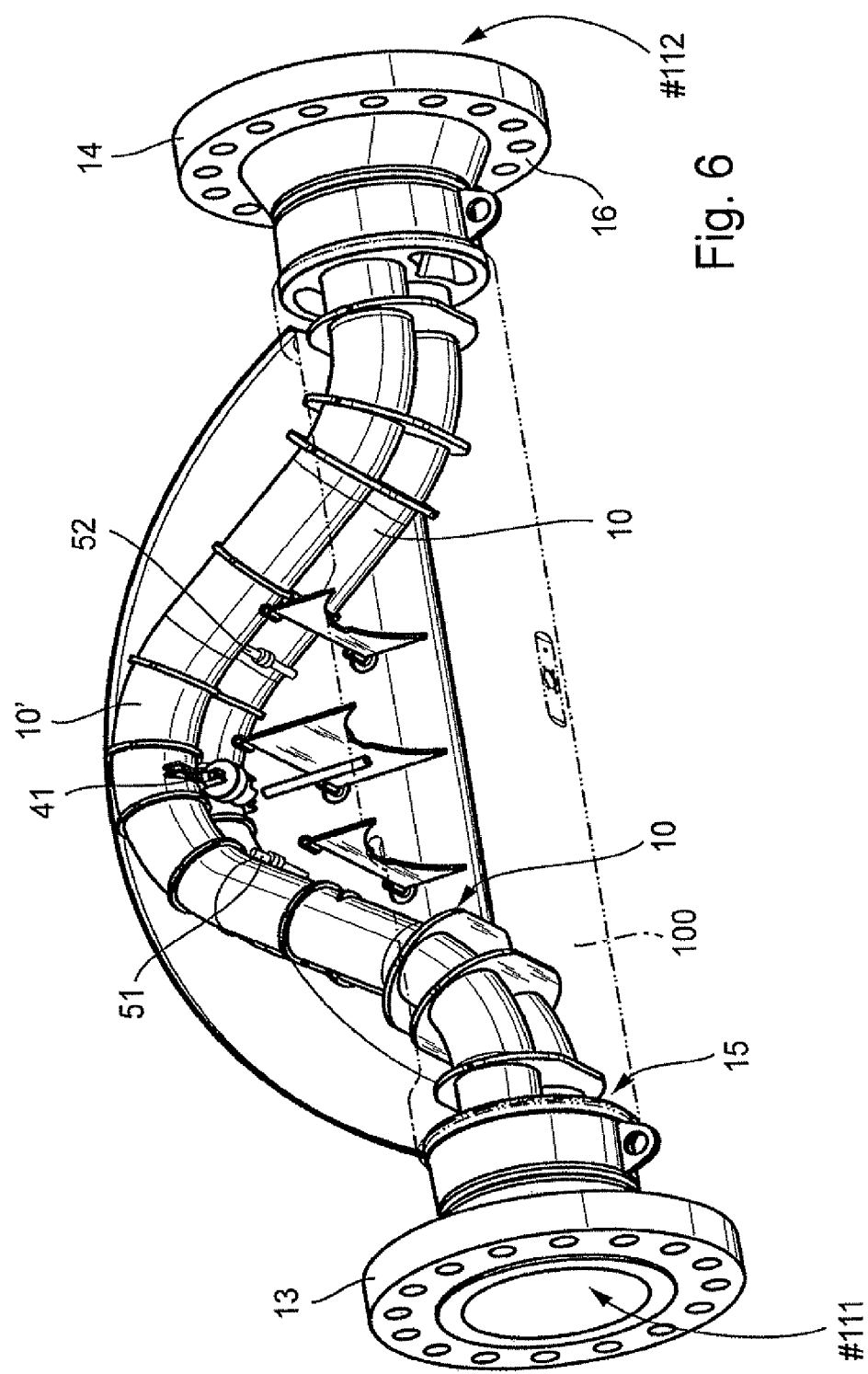
FIG. 6, FIG. 7 shows in partially sectioned and perspective views, another variant of a measuring transducer of vibration-type, especially one suited for a measuring system according to FIGS. 2a, 2b, with measuring tubes vibrating during operation.
Figure 7:
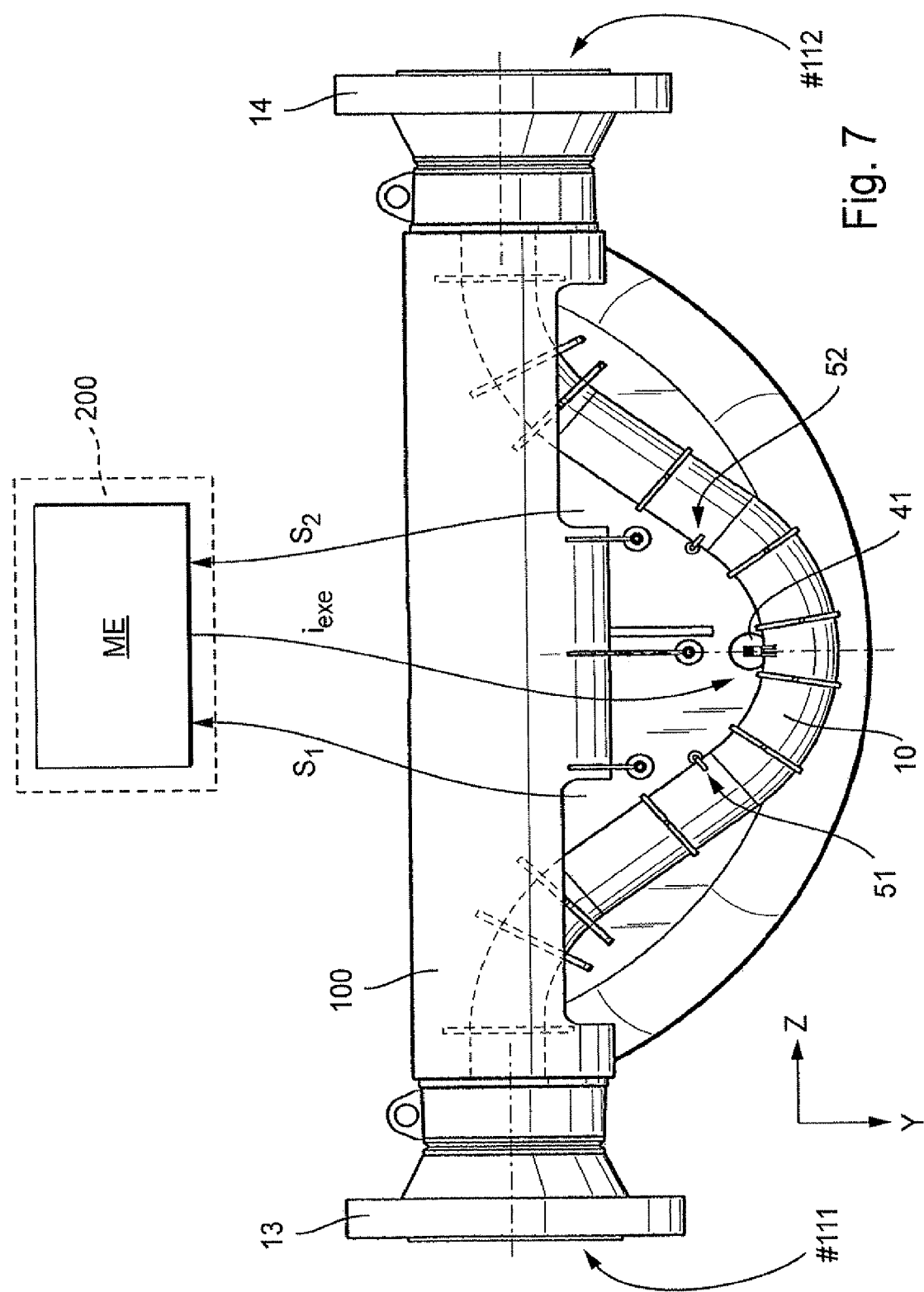

For conveying flowing medium, the inner part of the measuring transducer comprises generally at least a first—in the example shown in FIGS. 4 and 5 of an embodiment, a single, at least sectionally curved—measuring tube 10, which extends with a wanted, oscillatory length between an inlet-side, first measuring tube end 11# and an outlet-side, second measuring tube end 12#, and, for producing the aforementioned reaction forces during operation, is caused, at least at times, actively to vibrate with mechanical oscillations excited over its wanted, oscillatory length, and, in such case, is repeatedly oscillatingly, elastically deformed about a static resting position. The wanted, oscillatory length corresponds, in such case, to a length of an imaginary central- or also centroidal, axis (imaginary connecting line through the centers of gravity all cross sectional areas of the measuring tube) extending within the lumen; in the case of a curved measuring tube, thus, a stretched length of the measuring tube 10. It should be noted here that—although the measuring transducer in the example of an embodiment shown in FIGS. 4 and 5 has only a single, rather V-shaped, curved measuring tube and at least, insofar, in its mechanical construction, as well as also its principle of action, resembles the measuring transducers proposed in U.S. Pat. No. 7,360,451 or 6,666,098, and also available from the assignee under the marks "PROMASS H", "PROMASS P" or "PROMASS S"—for implementing the invention, of course, also measuring transducer with straight and/or more than one measuring tube, for example, thus two or four measuring tubes, can serve, for instance, comparable to those in the initially mentioned US-A 2010/0236338, US-A 2010/0242624, US-A 2010/0242623, U.S. Pat. No. 6,006, 609, 6,513,393, 7,017,424, 6,840,109, 6,920,798, 5,796,011, 5,731,527 or 5,602,345, or, for example, also those available from the assignee under the marks "PROMASS I", "PROMASS M", or "PROMASS E" or "PROMASS F", in each case, with two parallel measuring tubes. In accordance therewith, the measuring transducer can also have a single straight, measuring tube or at least two measuring tubes, for example, measuring tubes mechanically coupled with one another by means of an inlet-side flow divider and an outlet-side flow divider, in given cases, supplementally also by means of in- and outlet-side coupling elements, and/or measuring tubes constructed equally to one another and/or curved measuring tubes and/or measuring tubes parallel to one another, which serve for conveying medium to be measured, and which vibrate, at least at times, for instance, with equal frequency at a shared oscillation frequency, however, with opposite phase relative to one another, during operation, for producing the oscillation signals. In a further development of the invention, the measuring transducer comprises, such as, for instance, schematically presented in FIGS. 6 and 7, consequently, supplementally to the first measuring tube 10, a second measuring tube 10' which, for forming a first coupling zone, is mechanically connected with the first measuring tube 10 on the inlet side by means of a first coupling element, for example, a plate-shaped, first coupling element, and, for forming a second coupling zone, is mechanically connected with the first measuring tube 10 on the outlet side by means of a second coupling element. Also in this case, the first coupling zone thus defines, in each case, an inlet-side, first measuring tube end 11#, 11'# of each of the two measuring tubes 10, 10' and the second coupling zone, in each case, an outlet-side, second measuring tube end 12#, 12'# of each of the two measuring tubes 10, 10'. Since, for the case, in which the inner part is formed by means of two measuring tubes, each of the two measuring tubes 10, 10', especially measuring tubes oscillating during operation essentially with opposite phase relative to one another and/or mutually parallel measuring tubes and/or measuring tubes equally constructed as regards shape and material, serves for conveying medium to be measured, each of the two measuring tubes, in an additional embodiment of this second variant of the measuring transducer of the invention, opens on the inlet side into, in each case, one of two mutually spaced flow openings of a first flow divider 15 serving for dividing in-flowing medium flowing in two flow portions and on the outlet side into, in each case, one of two mutually spaced flow openings of a second flow divider 16 serving for guiding the flow portions back together, so that thus medium flows through the two measuring tubes during operation of the measuring system simultaneously and in parallel. In the example of an embodiment shown in FIGS. 6 and 7, the flow dividers are, insofar, integral components of the housing of the measuring transducer, formed as an inlet-side, first housing end defining the inlet end #111 of the measuring transducer by means of the first flow divider and formed as an outlet-side, second housing end defining the outlet end #112 of the measuring transducer by means of the second flow divider.

As directly evident from the combination of FIGS. 4 and 5, or 6 and 7, the at least one measuring tube 10 is, in each case, so formed that the aforementioned center line, as quite usual in the case of measuring transducers of the type being discussed, lies in an imaginary tube plane of the measuring transducer. According to an embodiment of the invention, the at least one measuring tube 10 is, during operation, in such case, caused to vibrate in such a manner that it oscillates, especially in a bending oscillation mode, about an oscillation axis coincident with or parallel to an imaginary connecting axis imaginarily connecting the two measuring tube ends 11#, 12#. The at least one measuring tube 10 is additionally so formed and arranged in the measuring transducer that the aforementioned connecting axis extends essentially parallel to, in given cases, also coincides with, an imaginary longitudinal axis L of the measuring transducer imaginarily connecting in- and outlet ends of the measuring transducer.

Figure 8:
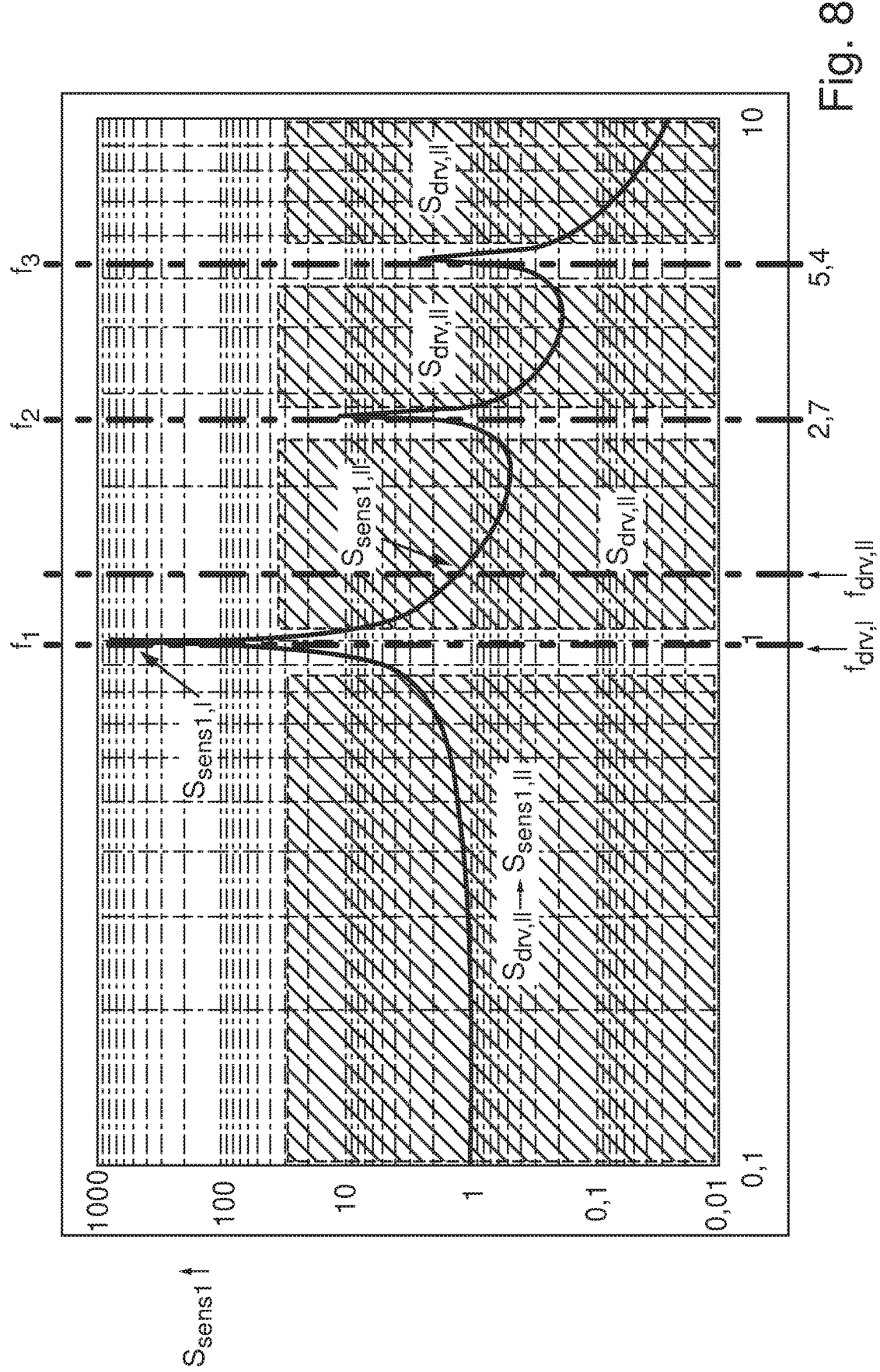
FIG. 8 shows schematically, a frequency spectrum detectable in a measuring transducer according to FIG. 4, 5, or 6, 7 of (eigen-) oscillations of a measuring tube contained in the measuring transducer.

The at least one measuring tube 10 of the measuring transducer (for example, one manufactured of stainless steel, titanium, tantalum, or zirconium or an alloy thereof), and, insofar, also an imaginary center line extending within the lumen of the measuring tube 10, can be e.g. essentially U-shaped or, as well as also shown in FIGS. 4 and 5, or 6 and 7, or also FIG. 8, essentially V-shaped. Since the measuring transducer should be applicable for a large number of most varied applications, especially in the fields of industrial measurements and automation technology, it is additionally provided that the measuring tube, depending on application of the measuring transducer, has a diameter, which lies in the range between about 1 mm and about 100 mm.

For minimizing disturbing influences acting on the inner part formed by means of a single measuring tube, as well as also for reducing oscillatory energy possibly released from the measuring transducer to the connected process line, the inner part of the measuring transducer further comprises, according to the example of an embodiment shown in FIGS. 4 and 5, a counteroscillator 20 mechanically coupled with the—here single, curved—measuring tube 10, for example, a counteroscillator 20 embodied with U-, or V-shape similarly as the measuring tube. Counteroscillator 20 is, as well as also shown in FIG. 2, arranged laterally spaced from the measuring tube 10 in the measuring transducer and affixed to the measuring tube 10, respectively, on the inlet side for forming a first coupling zone—ultimately defining the aforementioned first measuring tube end 11#—and on the outlet side for forming a second coupling zone—ultimately defining the aforementioned second measuring tube end 12#. The counteroscillator 20—here extending essentially parallel to the measuring tube 10, in given cases, also coaxially arranged relative thereto—is produced of a metal, such as, for instance, steel, titanium, or zirconium, compatible with the measuring tube as regards thermal expansion behavior and can, in such case, also be embodied, for example, tubularly or also essentially box-shaped. As shown in FIG. 2 or provided, among other things, also in U.S. Pat. No. 7,360,451, the counteroscillator 20 can be formed, for example, by means of plates arranged on the left- and right sides of the measuring tube 10 or also by means of blocked tubes arranged on the left- and right sides of the measuring tube 10. Alternatively, thereto, the counteroscillator 20 can—as provided, for instance, in U.S. Pat. No. 6,666,098—also be formed by means of a single blocked tube extending laterally of the measuring tube and parallel thereto. As evident from a combination of FIGS. 2 and 3, the counteroscillator 20 in the example of an embodiment shown here is held to the first measuring tube end 11# by means of at least one inlet-side, first coupler 31 and to the second measuring tube end 12# by means of at least one outlet-side, second coupler 32, especially one essentially identical to the first coupler 31. Serving as couplers 31, 32 can be, in such case, e.g. simple node plates, which are secured in appropriate manner on the inlet side and on the outlet side, in each case, to measuring tube 10 and to counteroscillator 20. Additionally, as provided in the case of the example of an embodiment shown in FIGS. 2 and 3, a completely closed box or, in given cases, also a partially open frame, formed by means of node plates mutually spaced in the direction of the imaginary longitudinal axis L of the measuring transducer, together with protruding ends of the counteroscillator 20 on the inlet side and on the outlet side, can serve, respectively, as coupler 31 and coupler 32. As schematically presented in FIGS. 2 and 3, the measuring tube 10 is additionally connected to the process line (not shown), supplying and, respectively, draining the medium, via a straight, first connecting tube piece 11 opening on the inlet side in the region of the first coupling zone and via a straight, second connecting tube piece 12, especially one essentially identical to the first connecting tube piece 11, opening on the outlet side in the region of the second coupling zone, wherein an inlet end of the inlet-side, connecting tube piece 11 essentially forms the inlet end of the measuring transducer and an outlet end of the outlet-side, connecting tube piece 12 the outlet end of the measuring transducer. In advantageous manner, the measuring tube 10 and the two connecting tube pieces 11, 12 can be embodied as one piece, so that e.g. a single tubular stock, or semifinished part, of a material usual for such measuring transducers, such as e.g.

stainless steel, titanium, zirconium, tantalum or corresponding alloys thereof, can serve for their manufacture. Instead of forming measuring tube 10, inlet tube piece 11 and outlet tube piece 12, in each case, by segments of a single, one piece tube, these can, in case required, however, also be produced by means of individual, subsequently joined together, e.g. welded together, stock, or semifinished parts. In the example of an embodiment shown in FIGS. 2 and 3, it is additionally provided that the two connecting tube pieces 11, 12, are so oriented relative to one another as well as to an imaginary longitudinal axis L of the measuring transducer imaginarily connecting the two coupling zones 11#, 12# that the inner part formed here by means of counteroscillator and measuring tube, along with twisting of the two connecting tube pieces 11, 12, can move like a pendulum about the longitudinal axis L. For such purpose, the two connecting tube pieces 11, 12 are so oriented relative to one another such that the essentially straight, tube segments extend essentially parallel to the imaginary longitudinal axis L, or to the imaginary oscillation axis of the bending oscillations of the measuring tube, such that the tube segments essentially align both with the longitudinal axis L as well as also relative to one another. Since the two connecting tube pieces 11, 12 in the example of an embodiment shown here are essentially straight over their entire length, they are accordingly, as a whole, relative to one another as well as to the imaginary longitudinal axis L, essentially aligned with one another. As evident furthermore from FIGS. 2 and 3, the measuring transducer housing 100 is, especially in comparison to the measuring tube 10, bending- and torsion stiffly, especially rigidly, affixed to an inlet end of the inlet-side, connecting tube piece 11 distal relative to the first coupling zone as well as to an outlet end of the outlet-side, connecting tube piece 12 distal relative to the first coupling zone. Insofar, thus, the entire inner part— here formed by means of measuring tube 10 and counteroscillator 20—is not only encased completely by the measuring transducer housing 100, but, also, as a result of its eigenmass and the spring action of both connecting tube pieces 11, 12, also held oscillatably in the measuring transducer housing 100.

For the typical case, in which the measuring transducer MT is to be assembled releasably with the process line formed, for example, as a metal pipeline, provided on the inlet side of the measuring transducer is a first connecting flange 13 for connection to a line segment of the process line supplying medium to the measuring transducer and on the outlet side a second connecting flange 14 for connection to a line segment of the process line draining medium from the measuring transducer. The connecting flanges 13, 14 can, in such case, as is quite usual in the case of measuring transducers of the described type, also be integrated terminally in the measuring transducer housing 100. In case required, the connecting tube pieces 11, 12 can, moreover, however, also be connected directly with the process line, e.g. by means of welding or hard soldering. In the example of an embodiment shown in FIGS. 2 and 3, the first connecting flange 13 is formed on the inlet-side, connecting tube piece 11 on its inlet end and the second connecting flange 14 on the outlet-side, connecting tube piece 12 on its outlet end, while in the example of an embodiment shown in FIGS. 4 and 5, the connecting flanges are correspondingly connected with the associated flow dividers.

As already multiply mentioned, in the case of the measuring system of the invention, the reaction forces required for the measuring are effected in the respective medium to be measured by causing the at least one measuring tube to oscillate in an actively excited, oscillatory mode, the so-called wanted mode. Selected as wanted mode in such case is, as quite usual in the case of measuring transducers of the type being discussed, at least one of a large number of the natural oscillation modes inherent to the at least one measuring tube, in which said measuring tube has in the region of its measuring tube ends, in each case, an oscillation node and can execute, or executes, in the region of its length that oscillates, at least one oscillatory antinode having resonance oscillations about a resting position, whose particular eigenoscillation form as well as also its particular eigenfrequency, as is known, decisively depends also on media parameters of the medium flowing in the measuring tube, especially its instantaneous density and viscosity. Particularly as a result of this dependence on the medium flowing through the at least one measuring tube (consequently, the measuring transducer), during operation, the natural oscillation modes of the measuring transducer are, in considerable measure, variable. Depending on manner of construction, application and measuring range, the eigenfrequencies can, in such case, vary within a wanted-frequency band moving quite in the range of some 100 Hz or even in the kilohertz range. In the case of exciting the at least one measuring tube to one of its instantaneous eigen- or also resonance frequencies, thus, on the one hand, based on the instantaneously excited oscillation frequency, an average density of the medium flowing instantaneously through the at least one measuring tube can easily be ascertained. On the other hand, so also the electrical power instantaneously required to maintain the excited oscillations in the wanted mode can be minimized. Besides the aforementioned dependence of the natural oscillation modes of the at least one measuring tube on the therein instantaneously guided medium, the natural oscillation modes of measuring tubes are basically, however, also determined by their respective size, shape, material and wall thickness, as well as the particular mechanical coupling to other components of the measuring transducer, such as, for instance, the measuring transducer housing, an additional measuring tube provided in given cases, or a counteroscillator etc., consequently also by the forces or—moments, in given cases, also fluctuating forces or—moments, acting during operation at the measuring tube ends and, respectively, at the coupling zones.

For active exciting of vibrations of the at least one measuring tube, especially also those in the aforementioned wanted mode, the measuring transducer additionally comprises an exciter mechanism 5 formed by means of at least one electro-mechanical oscillation exciter in interactive connection with the at least one measuring tube, for example, an electro-dynamic, oscillation exciter, which serves to set and, respectively, maintain oscillations of the at least one measuring tube operationally, at least at times, in the wanted mode suitable, in each case, for the particular measuring, for example, bending oscillations in a natural bending oscillation mode, with, in each case, sufficiently large oscillation amplitude for producing and registering the above named reaction forces in the medium. The at least one oscillation exciter—, for instance, an electrodynamic, oscillation exciter, namely one formed by means of a solenoidal coil—, consequently the exciter mechanism, serves, in such case, especially, to convert an electrical, excitation power $P_{exc}$ fed from the transmitter electronics by means of at least one electrical driver signal $s_{drv}$ into exciter forces $F_{exc}$, e.g. pulsating or harmonic, thus essentially sinusoidal, exciter forces $F_{exc}$, which act correspondingly on the at least one measuring tube and, thus, effect the desired oscillations in the wanted mode. For example, the at least one driver signal can simultaneously also have a plurality of sinusoidal signal components with signal frequencies differing from one another, of which one—, for instance, a signal component dominating, at least at times, as regards signal power—has a signal frequency corresponding to an eigenfrequency of a natural mode of oscillation selected as wanted mode. The exciter forces $F_{exc}$ generated by converting electrical, excitation power $P_{exc}$ fed into the exciter mechanism can, in such case, in manner known, per se, to those skilled in the art, e.g. by means of a driver circuit Exc provided in the transmitter electronics 12 and delivering, ultimately, the driver signal, be correspondingly adjusted, for instance, by means of an electrical current controller implemented in the driver circuit and controlling an amplitude (electrical current level) of an electrical current of the driver signal and/or by means of a voltage controller controlling amplitude (voltage level) of a voltage of the driver signal as regards its size and, e.g. by means of a phase control loop (PLL) likewise provided in the operating circuit, as regards their instantaneous frequency or in the case multifrequency exciting as regards their instantaneous frequencies; compare, for this, for example, also U.S. Pat. No. 4,801,897 or 6,311,136. The construction and application of the aforementioned phase control loops for the active exciting of measuring tubes to oscillations at one of their mechanical eigenfrequencies is described at length e.g. in U.S. Pat. No. 4,801,897. Of course, also other driver circuits suitable for the tuning the exciter energy $E_{exc}$, known, per se, to those skilled in the art, can be used, for example, also according to the initially mentioned state of the art, for instance, the initially mentioned U.S. Pat. Nos. 4,777,833, 4,801,897, 4,879,911, 5,009,109, 5,024,104, 5,050,439, 5,804,741, 5,869,770, 6,073,495 or 6,311,136. Additionally, as regards an application of such driver circuits for measuring transducers of vibration-type, reference is made to the transmitter electronics provided with measurement transmitters of the series "PROMASS 83", as such are available from the assignee, for example, in connection with measuring transducers of the series "PROMASS E", "PROMASS F", "PROMASS H", "PROMASS I", "PROMASS P" or "PROMASS S". Their driver circuit is, for example, in each case, so executed that bending oscillations in the wanted mode are controlled to a constant, largely independent amplitude, thus also largely independent of density, $\rho$.

In the case of the measuring system of the invention, it is, in such case, provided, especially, that the transmitter electronics feeds into the oscillation exciter, consequently the therewith formed exciter mechanism, the electrical, excitation power required for generating the exciter forces. The transmitter electronics accomplishes this feeding by means of an electrical driver signal $s_{drv}$, which, at least at times, has a sinusoidal signal component (preferably a signal component having an ample number of oscillation periods) $s_{drv,1}$ of first type with a signal frequency, $f_{drv,1}$, which, as schematically indicated in FIG. 8, corresponds to an instantaneous eigenfrequency, $f_1$, of a natural mode of oscillation of first order of the at least one measuring tube, in which the at least one measuring tube can execute, or executes, eigenoscillations about a resting position, which eigenoscillations have in the region of the first and second measuring tube ends, in each case, an oscillation node and in the region of the wanted, oscillatory length exactly one oscillatory antinode, so that thus the at least one measuring tube executes, at least at times, excited by the at least one oscillation exciter 41, at least partially, especially in the case of application of said oscillatory mode as wanted mode, predominantly, resonance oscillations, namely resonance oscillations with an oscillation frequency, $f_{drv,1}=f_1$, corresponding to the instantaneous eigenfrequency, $f_1$, of the mode of oscillation of first order.

Especially for the mentioned case, in which the measuring system ultimately formed by means of the measuring transducer is to be used for measuring mass flow, it can be especially advantageous to have the at least one measuring tube 10 be actively excited during operation by means of the exciter mechanism, at least at times, in a wanted mode, in which it executes, especially predominantly or exclusively, bending oscillations about its resting position, and, indeed, predominantly with exactly one natural eigenfrequency (resonance frequency), which corresponds to a bending oscillation, fundamental mode of first order, in which the at least one oscillating measuring tube has in the region of its wanted, oscillatory length exactly one (bending-) oscillatory antinode. A goal of exciting the bending oscillation, fundamental mode of first order, and, respectively, its application as wanted mode, is thus, among other things, to induce by means of the at least one vibrating measuring tube sufficiently strong Coriolis forces in the through-flowing medium that, as a result, deformations of each of the measuring tubes corresponding to an additional, thus an oscillatory mode of higher order of the tube arrangement— the so-called Coriolis mode—can be effected with oscillation amplitudes sufficient for measuring. For the operationally provided case, in which the medium is flowing in the process line and, thus, the mass flow m is different from zero, by means of at least one measuring tube 10 vibrating in this manner, also Coriolis forces are induced in the through-flowing medium. These, in turn, react on the measuring tube 10 and effect, in this way, an additional deformation of the measuring tube registerable by sensor, and, indeed, essentially according to an additional natural eigenoscillation form of higher modal order than the wanted mode. An instantaneous value of this Coriolis mode superimposed with equal frequency on the excited wanted mode is, in such case, especially as regards its amplitude, also dependent on the instantaneous mass flow, m, and can, for example, in the case the application of the measuring system as a Coriolis, mass flow measuring device, serve for ascertaining the mass flow rate, or the totalled mass flow.

In accordance therewith, in an additional embodiment of the invention, the driver signal is, at least at times, so formed that the signal frequency, $s_{drv,1}$, of its signal component of first type corresponds as exactly as possible to an instantaneous eigenfrequency of a natural bending oscillation mode, namely the bending oscillation, fundamental mode, in which the at least one vibrating measuring tube executes bending oscillations about its resting position, which have in the region of the first and second measuring tube ends, in each case, an oscillation node and in the region of the wanted, oscillatory length exactly one oscillatory antinode, consequently the at least one measuring tube, excited by the at least one oscillation exciter, executes, at least partially, especially predominantly, bending resonance oscillations, namely resonance oscillations with an oscillation frequency corresponding to the instantaneous eigenfrequency of said bending oscillation mode. In the case of an application of a measuring tube manufactured of stainless steel, especially Hastelloy, with a caliber of 29 mm, a wall thickness s of, for instance, 1.5 mm, a wanted, oscillatory length of, for instance, 420 mm and a chordal length, measured between the two measuring tube ends, of 305 mm, the eigenfrequency of the same corresponding to the bending oscillation, fundamental mode would be, for example, about 500 Hz in the case of a density of practically zero, e.g. in the case of a measuring tube filled only with air.

In the example of an embodiment shown in FIGS. 4 and 5, having the inner part formed by means of measuring tube and counteroscillator, the measuring tube 10 executes, predominantly relative to the counteroscillator 20, the bending oscillations actively excited by means of the exciter mechanism, especially relative to one another with opposite phase at a shared oscillation frequency. In the case of an exciter mechanism acting simultaneously, for example, differentially, both on measuring tube as well as also on counteroscillator, in such case, the counteroscillator 20 is also, of necessity, excited to simultaneous cantilever oscillations, and, indeed, such that it oscillates with equal frequency, however, at least partially, out of phase, especially essentially with opposite phase, to the measuring tube 10 oscillating in the wanted mode. Especially, measuring tube 10 and counteroscillator 20 are, in such case, additionally so matched to one another, or so excited, that they execute, during operation, at least at times, and, at least partially, opposite-equal bending oscillations, thus with equal frequency, however, essentially opposite phase, about the longitudinal axis L. The bending oscillations can be so embodied, in such case, that they are of equal modal order and, thus, at least in the case of resting fluid, are essentially equally formed; in the other case wherein two measuring tubes are applied, these are, as usual in the case of measuring transducers of the type being discussed, actively so excited by means of the exciter mechanism acting, especially differentially, between the two measuring tubes 10, 10' that they execute during operation, at least at times, opposite-equal bending oscillations about the longitudinal axis L. In other words, the two measuring tubes 10, 10', or measuring tube 10 and counteroscillator 20, move then, in each case, in the manner of tuning fork tines oscillating opposite to one another. For this case, according to an additional embodiment of the invention, the at least one electro-mechanical, oscillation exciter is so designed therefor, to excite, or to maintain, opposite-equal vibrations of the first measuring tube and of the second measuring tube, especially bending oscillations of each of the measuring tubes about an imaginary oscillation axis imaginarily connecting the respective first measuring tube end and the respective second measuring tube end. Serving as Coriolis mode, as usual in the case of such measuring transducers with curved measuring tube can be e.g. the eigenoscillation form of the anti-symmetric twist mode, thus that mode, in the case of which the measuring tube 10, as already mentioned, also executes rotary oscillations about an imaginary rotary oscillation axis directed perpendicularly to the bending oscillation axis, and cutting the center line of the measuring tube 10 imaginarily in the region of half the oscillatory length.

For the mentioned case, in which the at least one measuring tube is essentially straight, the signal frequency of the signal component of first type of the driver signal, $s_{drv}$, can be set, for example, also at an instantaneous eigenfrequency of a natural torsional oscillation mode, namely that of the torsional oscillation, fundamental mode, in which the at least one vibrating measuring tube executes torsional oscillations about its resting position, namely, about an imaginary oscillation axis imaginarily connecting the inlet-side, first measuring tube end and the outlet-side, second measuring tube end, in such a manner that said torsional oscillations, especially also in a manner especially more favorable for measuring viscosity, have, in the region of the first and second measuring tube ends, in each case, an oscillation node and in the region of the wanted, oscillatory length exactly one oscillatory antinode. As a result thereof, thus, the at least one measuring tube, excited by the at least one oscillation exciter, then executes, at least partially, in given cases, also predominantly, torsional, resonance oscillations, namely torsional, resonance oscillations with an oscillation frequency corresponding to the instantaneous eigenfrequency of said torsional oscillation mode.

For registering oscillations of the at least one measuring tube 10, especially also the oscillations actively excited by means of the at least one oscillation exciter, the measuring transducer includes, additionally, in each case, a corresponding sensor arrangement 50. This comprises, as well as also schematically presented in FIGS. 4 to 7, a first oscillation sensor 51, for example, an electrodynamic, first oscillation sensor 51, —here spaced from the at least one oscillation exciter—and arranged on the at least one measuring tube 10, for delivering a sensor signal representing vibrations of the measuring tube 10 and serving as first oscillatory signal $s_{sens1}$ of the measuring transducer. The oscillatory signal $s_{sens1}$ can be, for example, an electrical (alternating-)voltage $u_{sens1}$ corresponding to the oscillations and having an amplitude $U_{sens1}$ (voltage level) dependent on an instantaneous amplitude of the oscillations of the at least measuring tube. The oscillatory signal $s_{sens1}$ can even basically contain a plurality of signal components different as regards their signal frequency, especially also such, which correspond to the actively excited and, insofar, desired oscillations of the at least one measuring tube. In accordance therewith, as schematically indicated in FIG. 8, the at least one oscillatory signal, $s_{sens1}$, has, in the case of the measuring system of the invention, corresponding to the driver signal delivered by the transmitter electronics, or to the therewith driven oscillations of the at least one measuring tube, at least at times, also a sinusoidal signal component $s_{sens1,J}$ of first type corresponding to a signal frequency, $f_{sens,J}$, of the signal frequency, $f_{drv,J}$, of the signal component $s_{drv,J}$ of first type of the driver signal $s_{drv}$, consequently the instantaneous eigenfrequency, $f_1$, of the accordingly excited mode of oscillation of first order, for example, thus the instantaneous eigenfrequency of the bending oscillation, fundamental mode or the instantaneous eigenfrequency of the mentioned torsional oscillation mode. At least in the case of application of the bending oscillation, fundamental mode as the actively excited oscillatory mode of first order, the signal component $s_{sens1,J}$ of first type of the oscillation signal has a phase difference relative to the equal frequency signal component $s_{sens1,J}$ of first type of the driver signal $s_{drv}$ dependent on the current mass flow of the medium flowing in the at least one measuring tube 10

According to a further development of the invention, the sensor arrangement additionally includes a second oscillation sensor 52 arranged spaced from the first oscillation sensor 52 on the at least one measuring tube 10, especially an electrodynamic, second oscillation sensor 52, which delivers a sensor signal likewise representing vibrations of the measuring tube 10 and serving as a second oscillatory signal $s_{sens2}$ of the measuring transducer. The second oscillatory signal $s_{sens2}$, same as the first sensor signal, has a signal component with a signal frequency corresponding to the signal frequency, $f_{drv,J}$, of the signal component $s_{drv,J}$ of first type of the driver signal $s_{drv}$, at least in the case of application of oscillation sensors constructed equally to one another, moreover, also a frequency spectrum comparable to that of the first oscillatory signal. A length of the region, especially an essentially freely vibrating region, of the associated at least one measuring tube extending between the two oscillation sensors, for example, equally constructed, oscillation sensors, corresponds, in such case, to a measuring length of the respective measuring transducer. In the here shown examples of embodiments, in each case, the first oscillation sensor 51 on the inlet side and the second oscillation sensor 52 on the outlet side are arranged on the at least one measuring tube 10, especially equally widely spaced from the at least one oscillation exciter and from the half length midpoint of the measuring tube 10. As quite usual in the case of such measuring transducers of vibration-type used in measuring systems in the form of a Coriolis, mass flow measuring device, the first oscillation sensor 51 and the second oscillation sensor 52 are, according to an embodiment of the invention, additionally, in each case, arranged on a side of the measuring tube occupied by the oscillation exciter 41 in the measuring transducer. Furthermore, also the second oscillation sensor 52 can be arranged on the side of the measuring tube occupied by the first oscillation sensor 51 in the measuring transducer. The oscillation sensors 51, 52 of the sensor arrangement can, in advantageous manner, additionally be so embodied that they deliver oscillation signals $s_{sens1}$, $s_{sens2}$ of the same type, for example, thus, in each case, an alternating voltage $u_{sense1}$, $u_{sens2}$. In an additional embodiment of the invention, both the first oscillation sensor as well as also the second oscillation sensor are additionally, in each case, so placed in the measuring transducer MT that each of the oscillation sensors registers, at least predominantly, vibrations of the at least one measuring tube 10. For the above described case, in which the inner part is formed by means of a measuring tube and a counteroscillator coupled therewith, in an additional embodiment of the invention, both the first oscillation sensor as well as also the second oscillation sensor are so embodied and so placed in the measuring transducer that each of the oscillation sensors registers, for example, differentially, predominantly, oscillations of the measuring tube relative to the counteroscillator, that thus both the first oscillatory signal $s_{sens1}$ as well as also the second oscillatory signal $s_2$, represent oscillatory movements, especially opposite-equal, oscillatory movements, of the at least one measuring tube 10 relative to the counteroscillator 20. For the other described case, in which the inner part is formed by means of two measuring tubes, especially measuring tubes oscillating opposite-equally during operation, in another embodiment of the invention, both the first oscillation sensor as well as also the second oscillation sensor are so embodied and so placed in the measuring transducer that each of the oscillation sensors registers, for example, differentially, predominantly, oscillations of the first measuring tube 10 relative to the second measuring tube 10', that thus both the first oscillatory signal $s_{sens1}$ as well as also the second oscillatory signal $s_{sens2}$ represent oscillatory movements, especially opposite-equal, oscillatory movements, of the two measuring tubes relative to one another, especially in such a manner that—as usual in the case of conventional measuring transducers—the first oscillatory signal produced by means of the first oscillation sensor represents inlet-side vibrations of the first measuring tube relative to the second measuring tube and the second oscillatory signal produced by means of the second oscillation sensor outlet-side vibrations of the first measuring tube relative to the second measuring tube. In an additional embodiment of the invention, it is further provided that the sensor arrangement has exactly two oscillation sensors, thus no additional oscillation sensors beyond the first and second oscillation sensors, and, insofar, as regards the used components, corresponds to conventional sensor arrangements for measuring transducers of the type being discussed.

It is to be noted additionally here that, although involved in the case of the oscillation sensors of the sensor arrangement 19 shown in the example of an embodiment are sensors of electrodynamic type, thus, in each case, a cylindrical magnet coil affixed on one of the measuring tubes and a therein plunging, permanent magnet correspondingly affixed on an oppositely lying measuring tube, additionally surely also other oscillation sensors known to those skilled in the art, such as e.g. opto-electronic, oscillation sensors can be used for forming the sensor arrangement. Also, as quite usual in the case of measuring transducers of the type being discussed, supplementally to the oscillation sensors, other sensors can be provided in the measuring transducer, such as e.g. acceleration sensors for registering movements of the total measuring system caused by external forces and/or asymmetries in the tube arrangement, strain gages for registering expansions of one or more of the measuring tubes and/or the transducer housing, pressure sensors for registering a static pressure reigning in the transducer housing and/or temperature sensors for registering temperatures of one or more of the measuring tubes and/or the transducer housing, by means of which supplemental sensors, for example, the ability of the measuring transducer to function and/or changes of the sensitivity of the measuring transducer to the measured variables primarily to be registered, especially the mass flow rate and/or the density, as a result of cross sensitivities, or external disturbances, can be monitored and, in given cases, correspondingly compensated.

The sensor arrangement 19 is additionally, as usual in the case of such measuring transducers, coupled in suitable manner, for example, hardwired via connecting lines, with a, measuring circuit correspondingly provided in the transmitter electronics and formed, for example, by means of at least one microprocessor and/or by means of at least one digital signal processor. The at least one oscillatory signal consequently delivered from the measuring transducer by the sensor arrangement, is, as well as also shown in FIG. 3, fed to the transmitter electronics ME and there then to the therein provided, measuring- and evaluating circuit μC, where they are first preprocessed, especially preamplified, filtered and digitized by means of a corresponding input circuit FE, in order that they then can be suitably evaluated. The measuring circuit receives the oscillation signals of the sensor arrangement 19 and generates therefrom, especially also from the signal component of first type contained in the at least one oscillation signal, or in the oscillation signals, the initially mentioned measured values, which represent, for example, a mass flow rate, a totalled mass flow and/or a density and/or a viscosity of the medium to be measured; this, in given cases, also taking into consideration the electrical, excitation power fed by means of the at least one driver signal, especially its signal component of first type, into the exciter mechanism, and, consequently, also therein converted. Input circuit FE, as well as also measuring- and evaluating circuit μC, can be, in such case, already applied and established circuit technologies, for example, also such according to the initially mentioned state of the art, applied in conventional Coriolis, mass flow measuring devices for the purpose of converting the oscillation signals, or of ascertaining therefrom variables such as mass flow rates and/or totalled mass flows, etc. According to an additional embodiment of the invention, the measuring- and evaluating circuit μC is accordingly also implemented by means of a microcomputer provided in the transmitter electronics ME, for example, by means of a digital signal processor (DSP), and by means of program code correspondingly implemented and executed therein. The program code can be persistently stored e.g. in a non-volatile data memory EEPROM of the microcomputer serving, in given cases, for storing, over a longer period of time, measured values generated by means of the measuring system, and can be loaded at start up into a volatile data memory RAM, e.g. one integrated in the microcomputer. Equally, measured values generated by means of the transmitter electronics during operation can be loaded into such a volatile data memory RAM, in given cases, also the same, volatile data memory RAM, and correspondingly held there for later further processing. Suitable for such applications are processors e.g. such as those of the type TMS320VC33 available from the firm, Texas Instruments Inc. Of course, the at least one oscillatory signal, or the oscillation signals $s_{sense1}$, $s_{sense2}$, are, as already indicated, converted by means of a corresponding analog to digital converter A/D of the transmitter electronics ME into corresponding digital signals for processing in the microcomputer; compare, for this, for example, the initially mentioned U.S. Pat. No. 6,311,136 or 6,073,495 or also the aforementioned measurement transmitters of the series, "PROMASS 83". Furthermore, the measured values can, as already mentioned, be displayed on-site and/or also sent in the form of digital, measured data to a data processing system superordinated to the measuring system and there further processed.

The transmitter electronics 12, including the therein implemented measuring- and operating circuit, can, furthermore, be accommodated, for example, in a separate electronics housing $7_2$, which is arranged remotely from the measuring transducer, or, as shown in FIG. 1, for forming a single compact device, is arranged affixed directly on the measuring transducer 1, for example, externally on the transducer housing $7_1$. In the case of the example of an embodiment shown here, consequently, a necklike transition piece is additionally placed on the transducer housing $7_1$ to serve for holding the electronics housing $7_2$. Within the transition piece, there can be arranged, additionally, a hermetically sealed and/or pressure resistant feedthrough, for example, one manufactured by means of glass- and/or plastic potting compound, through which is led electrical connecting lines between the measuring transducer 11, especially the therein placed oscillation exciters and sensors, and the mentioned transmitter electronics 12.

The transmitter electronics serves, according to an additional embodiment of the invention, additionally, with application of the oscillation signals $s_1$, $s_2$, delivered by the sensor arrangement 50, for example, based on a phase difference detected between the oscillation signals $s_1$, $s_2$ of the first and second oscillation sensor 51, 52, generated in the case of measuring tube 10 oscillating partially in the wanted- and Coriolis modes, recurringly to ascertain a mass flow-measured value $X_m$, which represents, as exactly as possible, the mass flow rate, m, to be measured for medium guided through the measuring transducer. For such purpose, the measuring, and evaluating, circuit produces, according to an additional embodiment of the invention, during operation, recurringly, a phase difference, measured value, which represents, instantaneously, the phase difference, $\Delta\varphi$, existing between the signal component of first type of the first oscillatory signal $s_1$ and signal component of first type of the second oscillation signal $s_2$. The calculating of the mass flow, measured value $X_m$ can occur using the signal frequency of the signal component of first type of the driver—, or of the at least one sensor signal, likewise available in the transmitter electronics, thus, for example, based on the known relationship:

$$\frac{\Delta\varphi}{f_{drv,l}} \sim m \rightarrow X_m.$$

Additionally, the measuring, and evaluating, circuit of the measuring system of the invention serves, according to an additional embodiment of the invention, derived from the instantaneous eigenfrequency represented by the instantaneous signal frequency of the signal component of first type of the driver—, or of the at least one sensor signal, in manner known, per se, to those skilled in the art, supplementally to generate a density measured value $X_\rho$ representing the density of the medium, for example, based on the known relationship:

$$\frac{1}{f_{drv,l}^2} \sim \rho \rightarrow X_\rho.$$

Alternatively thereto or in supplementation thereof, the evaluating circuit can, as quite usual in the case of measuring systems of the type being discussed, in given cases, also be used to ascertain a viscosity measured value $X_\eta$; compare, for this, also the initially mentioned U.S. Pat. No. 7,284,449, 7,017,424, 6,910,366, 6,840,109, 5,576,500 or 6,651,513. Suited for ascertaining the exciter energy or excitation power, or attenuation or damping, required for determining viscosity is, in such case, for example, the driver signal delivered by the driver circuit of the transmitter electronics, for instance, the amplitude and signal frequency of its signal component of first type or also an amplitude of the total driver signal, in given cases, also normalized on an oscillation amplitude ascertained based on at least one of the oscillation signals, especially the electrical current of the driver signal. Alternatively thereto or in supplementation thereof, however, also an internal control signal serving for tuning the signal component of first type of the driver signal or, for example, in the case of an exciting of the vibrations of the at least one measuring tube with an exciter current of fixedly predetermined amplitude, or an amplitude controlled to be constant, also at least one of the oscillation signals, especially an amplitude of its signal component of first type, can serve as a measure of the exciter energy or excitation power, or attenuation required for ascertaining the viscosity measured value.

As ready mentioned, in the case of measuring systems of the type being discussed, the at least one measuring tube can be exposed to varied loadings and, insofar, over the total operating time of the measuring system can be changed in scarcely, or not at all, foreseeable manner in such a way that, as a result, a measuring transducer transfer function inherent to the measuring transducer, and, consequently, to the therewith formed measuring system, according to which function the measuring transducer converts the driver signal, for instance, an electrical current $i_{drv}$ flowing in the at least one oscillation exciter or a voltage $u_{drv}$ driving such, into the at least one oscillatory signal $s_{sens1}$, for instance, a voltage $u_{sens1}$ generated by means of the at least one oscillation sensor and serving as oscillatory signal $s_{sens1}$, can, over the operating time of the measuring system, deviate in considerable measure from an original measuring transducer transfer function ascertained earlier therefor in a reference state of the measuring transducer or measuring system, for instance, in a calibrating and/or at a start-up of the measuring system and/or in the case of a later adjusting of the installed measuring system. As a result of such a change of the measuring transducer transfer function, there changes ultimately also a measuring system transfer function, according to which the measuring system maps the parameters of the medium to be registered into the corresponding measured value and there sinks, thus, also the accuracy of measurement, with which the measuring system produces the above mentioned, future measured values, in comparison to the originally much higher accuracy of measurement. Causes of such changes can be, for example, thermal or mechanical overloadings, such as, for instance, thermal shocks, excess temperatures and/or—pressures acting on the measuring transducer, increased clamping- and/or shaking forces exerted by the connected process line on the measuring transducer or eroding of the measuring tube, namely abrasion- and/or corrosion phenomena, effected by the medium flowing in the at least one measuring tube or the forming of an accretion clinging to an inner surface of the measuring tube contacting the medium to be measured during operation, etc. As a result of such influences, there can occur on the measuring tube, for example, deformation, material removal, crack formation, material fatigue or other phenomena, which decrease the structural integrity of the measuring transducer, consequently the operational safety of the total measuring system, and cause the measuring system to age faster. Such aging phenomena ultimately decreasing the accuracy of measurement can, for example, be based on the fact that irreversible changes occur in an oscillatory behavior of the at least one measuring tube, thus its natural oscillation modes, an electrical impedance of the at least one oscillation sensor, an electrical impedance of the at least one oscillation exciter, a transducer constant of the at least one oscillation exciter, according to which such converts the driver signal into a corresponding exciter force, and/or a transducer constant of the at least one oscillation sensor, according to which such transduces oscillatory movements of the at least one measuring tube into the corresponding oscillation signal.

Figure 9:
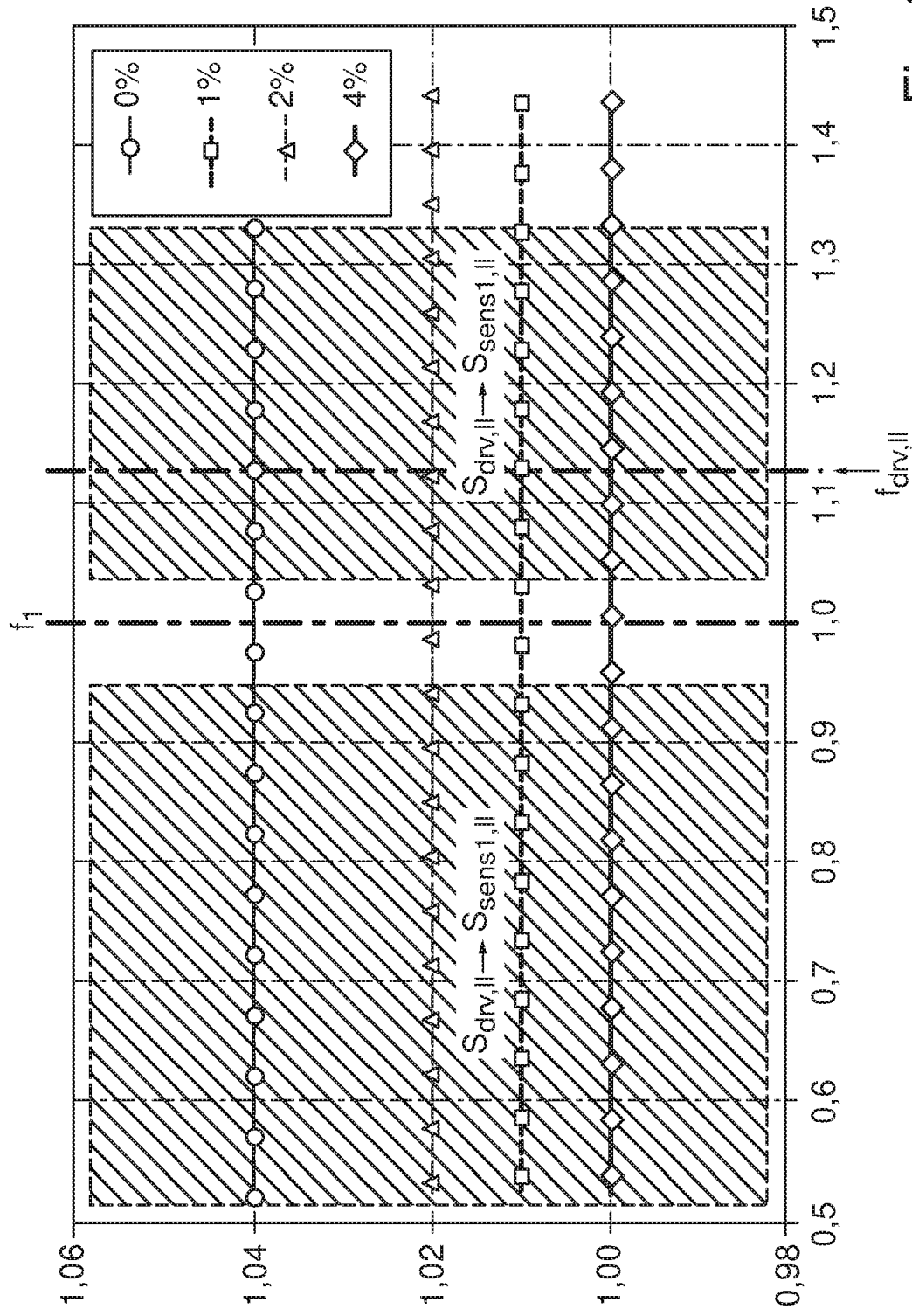
FIG. 9 shows results of experimental investigations performed in connection with the invention, especially also experimental investigations performed with application of computer based simulation programs and/or by means of real measuring systems in the laboratory, and, respectively, therefrom derived results for ascertaining an operating state of a measuring system according to the FIG. 1a, b, or 2a, b, or a deviation of the measuring system from a reference state earlier ascertained therefor.

Taking this into consideration, in the case of the measuring system of the invention, the transmitter electronics ME serves, especially, for the purpose of also recurringly performing a system diagnosis during ongoing measurement operation, to detect, during operation, namely at a point in time $t_i$, a deviation of the measuring system caused, for instance, as a result of overloadings of the aforementioned type, from a reference state ascertained earlier therefor, namely at a point in time $t_{Ref}$ —, for example, thus in a calibrating and/or at a start-up of the measuring system with a medium of known temperature and density—and to signal such, in given cases, by means of a corresponding system status report $Sys_{fail}$, for example, a visually and/or acoustically perceptible, system status report $Sys_{fail}$, for instance, in the form of an alarm. For such purpose, the transmitter electronics is additionally so adapted that the driver signal $s_{drv}$ generated by means of the transmitter electronics, as indicated schematically in FIG. 8, at least at times, has a sinusoidal signal component $s_{drv,II}$ of second type, in given cases, also a sinusoidal signal component $s_{drv,II}$ of second type instantaneously dominating as regards signal power and/or encompassing a plurality of oscillation periods, with a signal frequency, $f_{drv,II}$, which deviates from each instantaneous eigenfrequency of each natural mode of oscillation of the at least one measuring tube, in each case, by more than 1 Hz, also as much as possible more than 5 Hz, and/or by more than 1%, as much as possible more than 10%, of said eigenfrequency. Excited by the at least one oscillation exciter 41 fed with said driver signal comprising the signal component $s_{drv,II}$ of second type, the at least one measuring tube, thus, executes, at least partially, forced oscillations outside of resonance and the at least one oscillatory signal $s_{sens1}$ has equally, at least at times, a sinusoidal signal component $s_{sens1,II}$ of second type with a signal frequency, $f_{sens,II}$, which corresponds to the signal frequency, $f_{drv,II}$, of the signal component $s_{drv,II}$ of second type of the driver signal$_{drv}$, consequently no instantaneous eigenfrequency of some natural mode of oscillation of the at least one measuring tube. In such case, it is directly also possible to generate the driver signal by means of the transmitter electronics in a manner such that it has simultaneously the signal component of first type and the signal component of second type, whereby the at least one measuring tube, excited by the at least one oscillation exciter, simultaneously executes both partially resonance oscillations, namely with an oscillation frequency, $f_{drv,I}=f_1$, corresponding to the instantaneous eigenfrequency, $f_1$, of the mode of oscillation of first order as well as also partially forced oscillations outside of resonance; in case required, the driver signal can have the signal component of first type, however, also in alternation with the signal component of second type. For the case, in which, for example, a material removal, consequently a reducing of wall thickness, is to be observed during operation in the case of the at least one measuring tube of the measuring transducer, the frequency spectrum of the at least one measuring tube schematically shown in FIG. 8 would show in the frequency range reached by means of the signal component of second type of the driver signal, consequently the accordingly generated signal component of second type of the oscillation signal, for example, the picture schematically illustrated in FIG. 9, this being based on laboratory measurements on a measuring tube, whose wall thickness was successively lessened by up to 4%. Clearly recognizable, in such case, is the almost linear relationship between the oscillation amplitude of the oscillations of the measuring tube outside of resonance, consequently the signal amplitude of the signal component of second type of the oscillation signal, or of the driver signal, and the, for the respective measurement point in time, instantaneous wall thickness of the at least one measuring tube. In case required, for instance, for the purpose of an additional improving of the reliability of the diagnosis, or for the purpose of an exact as possible measuring of the presently (remaining-) wall thickness of the at least one measuring tube, it can, at times, be advantageous, appropriately to compensate the, in the case of the present measurements neglected, small, almost linear dependence of the oscillation amplitude of the oscillations of the measuring tube also on the usually, in any event measured, temperature of the medium, or temperature of the measuring tube, and/or the, in any event measured, density of the medium, $\rho$.

According to an additional embodiment of the invention, especially also in the case of application of an electrodynamic oscillation exciter and/or—sensors, it is additionally provided that the signal frequency, $f_{drv,II}$, of the signal component $s_{drv,II}$ of second type of the driver signal is always set greater than 10 Hz, or that said signal frequency, $f_{drv,II}$ is greater than 0.1 times the instantaneous eigenfrequency of the mode of oscillation of first order. In supplementation thereof, according to an additional embodiment, it is additionally provided, especially also for the purpose of a safe preventing, or suppressing, of possible excitings of resonance oscillations, for instance, as a result of errors in the case of the frequency control actually implemented in the driver circuit, to so condition the driver signal by means of the transmitter electronics that the signal frequency $f_{drv,II}$ of its signal component $s_{drv,II}$ of second type corresponds to more than 1.01 times, as much as possible, however, also more than 1.15 times, and less than 2.7 times, as much as possible, however, also less than 2.4 times, an instantaneous eigenfrequency, $f_1$, of the mode of oscillation of first order, consequently to excite the at least one measuring tube actively in such a manner that it executes the forced oscillations outside of resonance with an oscillation frequency lying in a corresponding frequency range, $|1.01 \cdot f_1 < f_{drv,II} < 2.7 \cdot f_1|$, i.e. above 1.01 times, or above 1.15 times, and below 2.7 times, or below 2.4 times, the instantaneous eigenfrequency, $f_1$, of the mode of oscillation of first order, and the signal frequency of the second signal component $s_{sens1,II}$ of the oscillation signal $s_{sens1}$ lies equally above 1.01 times, or above 1.15 times, and below 2.7 times, or below 2.4 times, the instantaneous eigenfrequency, of the mode of oscillation of first order. The application of a signal frequency within the aforementioned narrow frequency range above 1.15- and below 2.4 times the instantaneous eigenfrequency, $f_1$, has proven itself for the therefrom derived system diagnosis, since the above mentioned dependencies, or also cross sensitivities, of the amplitude of the measuring tube oscillations, or the oscillation measurement signals on the medium—, or measuring tube temperature, as well as also on the density, $\rho$, of the medium are very small and, insofar, a variance of the amplitude can be negligibly small, in spite of comparatively mentionable fluctuating density and/or temperature. Alternatively thereto or in supplementation thereof, according to another embodiment of the invention, the signal frequency $f_{drv,II}$ of the signal component $s_{drv,II}$ of second type of the driver signal is so set by means of the transmitter electronics that said signal frequency $f_{drv,II}$ is smaller than an instantaneous eigenfrequency, $f_2$, of a mode of oscillation of second order of the at least one measuring tube, in which the at least one vibrating measuring tube can execute, or executes, oscillations about a resting position, which have in the region of the first and second measuring tube ends, in each case, an oscillation node and, in the region of the wanted, oscillatory length, an additional oscillation node as well as exactly two oscillatory antinodes, so that, thus, as a result, the at least one measuring tube executes the forced oscillations outside of resonance, in a frequency range, $|f_{drv,II} < f_2|$, which lies below the instantaneous eigenfrequency of the mode of oscillation of second order, —corresponding to the mentioned Coriolis mode—, and the at least one oscillatory signal, at least at times, has a signal component of second type with a signal frequency, which lies below the instantaneous eigenfrequency of the mode of oscillation of second order.

The tuning in of the actually desired signal frequency of the signal component of second type of the driver signal can occur, for example, according to a fixedly predetermined frequency ratio, for instance, one fixed by the manufacturer, or, however, multistep in the form of different signal frequencies purposely brought about, for instance, in such a manner that the transmitter electronics increases the signal frequency of the signal component of second type of the driver signal step-wise by a predeterminable magnitude, beginning at a starting value predetermined therefor within the aforementioned frequency range, $|1.01 \cdot f_1 < f_{drv,II} < 2.7 \cdot f_1|$, up to an end value predetermined for the signal frequency within said frequency range or lessens it step-wise by a predeterminable magnitude, or that the transmitter electronics linearly increases, or linearly lessens, the signal frequency of the signal component of second type of the driver signal beginning at a starting value predetermined therefor within the aforementioned frequency range $|1.01 \cdot f_1 < f_{drv,II} < 2.7 \cdot f_1|$, and progressing to an end value predetermined for the signal frequency within said frequency range, or that the transmitter electronics alternately linearly increases, or linearly lessens said signal frequency.

In an additional embodiment of the invention, the transmitter electronics ME is additionally provided and adapted, to check, or detect, during operation, by means of the signal component $s_{drv,II}$ of second type of the driver signal $s_{drv}$ and by means of the signal component $s_{sens1,II}$ of second type of the at least one oscillation signal $s_{sens1}$—, for example, also recurringly—whether and/or to what extent the measuring system deviates in comparison to the mentioned earlier ascertained (for instance, in a calibrating and/or at a start-up of the measuring system) reference state. Serving as a measure for such a deviation, can be, in advantageous manner, a system parameter, measured value, $G_{ME,ti}$, ascertained based on the signal component $s_{drv,II}$ of second type of the driver signal $s_{drv}$ and the signal component $s_{sens1,II}$ of second type of the at least one oscillation signal $s_{sens1}$. Based on the system parameter, measured value, $G_{ME,ti}$, a current measuring transducer transfer function, namely one acting at the point in time $t_i$, is ascertainable, according to which the measuring transducer converts the driver signal $s_{drv}$, consequently its signal component $s_{drv,II}$ of second type, for example, thus an electrical current flowing in the at least one oscillation exciter and serving as signal component $s_{drv,II}$ of second type of the driver signal, $s_{drv}$ $i_{drv,II} \rightarrow s_{drv,II}$, or a voltage driving such and serving as signal component $s_{drv,II}$ of second type of the driver signal, $s_{drv,II} \rightarrow s_{drv,II}$, into the at least one oscillatory signal, consequently its signal component $s_{sens1,II}$ of second type, for example, thus a voltage, $u_{sens1,II}$, generated by means of the at least one oscillation sensor and serving as signal component $s_{sens1,II}$ second type of the oscillation signal $s_{sens1}$. Alternatively, or in supplementation, the aforementioned deviation can also be ascertained based on a set of measured values for other system parameters, $g_{ME}$, equally characterizing the measuring system. Based on these other system parameters, $g_{ME}$, said measuring transducer transfer function can be correspondingly reconstructed during operation. A system parameter, $g_{ME}$, correspondingly representing the measuring transducer transfer function can be, for example, a complex (having a real- and an imaginary part) ratio, $u_{sens1,II}/i_{drv,II}$, of the voltage $u_{sens1,II} \rightarrow s_{sens1,II}$ generated by means of the at least one oscillation sensor and serving as signal component of second type of the oscillation signal $s_{sens1}$, to the electrical current $i_{drv,II} \rightarrow s_{drv,II}$ flowing in the at least one oscillation exciter and serving as signal component $s_{drv,II}$ of second type of the driver signal $s_{drv}$, or, for example, also a complex ratio—likewise having a real- and an imaginary part—, $u_{sens1,II}/u_{drv,II}$, of said voltage $u_{sens1,II} \rightarrow s_{sens1,II}$, to the voltage $u_{drv,II} \rightarrow s_{drv,II}$ driving the electrical current flowing in the at least one oscillation exciter and serving as signal component of second type of the driver signal $s_{drv}$.

In accordance therewith, serving as such system parameter, measured value, $G_{ME,ti} \rightarrow g_{ME,ti}$, ultimately representing the aforementioned measuring transducer transfer function and, consequently, the instantaneous state of the measuring system, and enabling a comparison with its reference state, can be a large number of measured variables, or therefrom derived, functional values, directly, measuring system internally ascertainable during operation, namely at the point in time $t_i$, such as, for example:

A phase difference, $\Delta\varphi_{II} = G_{ME,ti}$, between a voltage $u_{sens1,II} \rightarrow s_{sens1,II}$ generated by means of the at least one oscillation sensor and serving as signal component of second type of the oscillation signal $s_{sens1}$, and an electrical current $i_{drv,II} \rightarrow s_{drv}$, $_{II}$ flowing in the at least one oscillation exciter and serving as signal component of second type of the driver signal $s_{drv}$; and/or a phase difference, $\Delta\varphi_{II}|_{t_i}=G_{ME,ti}$, between a voltage $u_{sens1,II}\rightarrow s_{sens1,II}$ generated by means of the at least one oscillation sensor and serving as signal component of second type of the oscillation signal $s_{sens1}$, and a voltage $u_{drv,II}\rightarrow s_{drv,II}$ driving the electrical current flowing in the at least one oscillation exciter and serving as signal component of second type of the driver signal $s_{drv}$; and/or
a ratio, $$\left.\frac{U_{sens1,II}}{I_{drv,II}}\right|_{t_i} = G_{ME,ti},$$

of an amplitude (voltage level) $U_{sens1,II}$ of a voltage $u_{sens1}$, $_{II}\rightarrow s_{sens1,II}$ generated by means of the at least one oscillation sensor and serving as signal component of second type of the oscillation signal $s_{sens1}$, to an amplitude (electrical current level) $I_{drv,II}$ of an electrical current $i_{drv,II}\rightarrow s_{drv,II}$ flowing in the at least one oscillation exciter and serving as signal component $s_{drv,II}$ of second type of the driver signal $s_{drv}$; and/or
a ratio, $$\left.\frac{U_{sens1,II}}{U_{drv,II}}\right|_{t_i} = G_{ME,ti},$$

of an amplitude (voltage level) $U_{sens1,II}$ of a voltage $u_{sens1}$, $_{II}\rightarrow s_{sens1,II}$ generated by means of the at least one oscillation sensor and serving as signal component of second type of the oscillation signal $s_{sens1}$, to an amplitude (voltage level) $U_{drv,II}$ of a voltage $u_{drv,II}\rightarrow s_{drv,II}$ driving the electrical current flowing in the at least one oscillation exciter and serving as signal component of second type of the driver signal $s_{drv}$, or said ratio, multiplied by a parameter measured value representing an electrical impedance, $Z_{drv,II}$, of the at least one oscillation exciter effective for the signal component of second type of the driver signal, $$\left.\frac{U_{sens1,II}}{U_{drv,II}}\cdot Z_{drv,II}\right|_{t_i} = G_{ME,ti};$$

and/or
a functional value of the functional equation:

$$\left.\frac{\left(1-\frac{f_{drv,II}^2}{f_{drv,I}^2}\right)}{f_{drv,II}}\cdot\frac{U_{sens1,II}}{I_{drv,II}}\right|_{t_i} = \left.\frac{(1-\Omega^2)}{f_{drv,I}\cdot\Omega}\cdot\frac{U_{sens1,II}}{I_{drv,II}}\right|_{t_i} = G_{ME,ti};$$

and/or
a functional value of the functional equation:

$$\left.\frac{\left(1-\frac{f_{drv,II}^2}{f_{drv,I}^2}\right)}{f_{drv,II}}\cdot\frac{U_{sens1,II}}{U_{drv,II}}\cdot Z_{drv,II}\right|_{t_i} = \left.\frac{(1-\Omega^2)}{f_{drv,I}\cdot\Omega}\cdot\frac{U_{sens1,II}}{U_{drv,II}}\cdot Z_{drv,II}\right|_{t_i} = G_{ME,ti};$$

and/or
a functional value of the functional equation:

$$\left.\frac{\left(1-\frac{f_{drv,II}^2}{f_{drv,I}^2}\right)}{f_{drv,II}}\cdot\frac{U_{sens1,II}}{U_{drv,II}}\right|_{t_i} = \left.\frac{(1-\Omega^2)}{f_{drv,I}\cdot\Omega}\cdot\frac{U_{sens1,II}}{U_{drv,II}}\right|_{t_i} = G_{ME,ti};$$

and/or
a functional value of the functional equation:

$$\left.\frac{\left(1-\frac{f_{drv,II}^2}{f_{drv,I}^2}\right)}{f_{drv,II}}\cdot\frac{U_{sens1,II}}{U_{drv,II}}\cdot Z_{drv,II}\right|_{t_i} = \left.\frac{(1-\Omega^2)}{f_{drv,I}\cdot\Omega}\cdot\frac{U_{sens1,II}}{U_{drv,II}}\cdot Z_{drv,II}\right|_{t_i} = G_{ME,ti}.$$

In order, based on such system parameter, measured values representing the current state of the measuring system at the point in time $t_i$, to be able to perform a diagnosis of the measuring system, or to determine an instantaneous deviation of the measuring system from its reference state, it is necessary correspondingly to provide in the transmitter electronics the system parameter, reference values corresponding, in each case, to the system parameter, measured values to be used. Such system parameter, reference values are suitably ascertained, for example, in the course of a calibrating of the measuring system in the plant of the manufacturer and/or in the course of start-up of the measuring system already installed in the pipeline. For such purpose, the transmitter electronics includes, according to an additional embodiment, a data memory for such measured values, which serve as a reference state of the measuring system, thus reference values representing the measuring system at the point in time $t_{ref}$. Serving as data memory for said reference values can be, for example, the already mentioned, non-volatile, data memory EEPROM. Held in the data memory is a reference data set representing the reference state of the measuring system and comprising system parameter, reference values for different system parameters. The system parameter, reference values can be measured values produced, for example, by means of the measuring system itself located in the reference state, or produced by means of the measuring transducer conveying medium of known temperature. Taking into consideration the above named system parameter, measured values, the reference data set can be formed, for example, by means of the following measured values, or therefrom derived, functional values:

A phase difference, $\Delta\varphi_{II}G_{ME,t_{Ref}}$, between a voltage $u_{sens1}$, $_{II}\rightarrow s_{sens1,II}$ generated by means of the at least one oscillation sensor and serving as signal component of second type of the oscillation signal $s_{sens1}$, and an electrical current $i_{drv,II}\rightarrow s_{drv,II}$ flowing in the at least one oscillation exciter and serving as signal component of second type of the driver signal $s_{drv}$;
a phase difference, $\Delta\varphi_{II}|_{t_{Ref}}=G_{Me,t_{Ref}}$, between a voltage $u_{sens1,II}\rightarrow s_{sens1,II}$ generated by means of the at least one oscillation sensor and serving as signal component of second type of the oscillation signal $s_{sens1}$, and a voltage $u_{drv,II}\rightarrow s_{drv,II}$ driving the electrical current flowing in the at least one oscillation exciter and serving as signal component of second type of the driver signal $s_{drv}$;
a ratio, $$\left.\frac{U_{sens1,II}}{I_{drv,II}}\right|_{t_{Ref}} = G_{ME,t_{Ref}},$$

of an amplitude (voltage level) $U_{sens1,II}$ of a voltage $u_{sens1,II} \rightarrow s_{sens1,II}$ generated by means of the at least one oscillation sensor and serving as signal component of second type of the oscillation signal $s_{sens1}$, to an amplitude (electrical current level) $I_{drv,II}$ of an electrical current $i_{drv,II} \rightarrow s_{drv,II}$ flowing in the at least one oscillation exciter and serving as signal component $s_{drv,II}$ of second type of the driver signal $s_{drv}$;
a ratio, $$\left.\frac{U_{sens1,II}}{U_{drv,II}}\right|_{t_{Ref}} = G_{ME,t_{Ref}},$$

of an amplitude (voltage level) $U_{sens1,II}$ of a voltage $u_{sens1,II} \rightarrow s_{sens1,II}$ generated by means of the at least one oscillation sensor and serving as signal component of second type of the oscillation signal $s_{sens1}$, to an amplitude (voltage level) $U_{drv,II}$ of a voltage $u_{drv,II} \rightarrow s_{drv,II}$ driving the electrical current flowing in the at least one oscillation exciter and serving as signal component of second type of the driver signal $s_{drv}$, or said ratio, multiplied by a parameter measured value representing an electrical impedance, $Z_{drv,II}$, of the at least one oscillation exciter effective for the signal component of second type of the driver signal, i.e.

$$\left.\frac{U_{sens1,II}}{U_{drv,II}} \cdot Z_{drv,II}\right|_{t_{Ref}} = G_{ME,t_{Ref}};$$

a functional value of the functional equation:

$$\left.\frac{\left(1-\frac{f_{drv,II}^2}{f_{drv,I}^2}\right)}{f_{drv,II}} \cdot \frac{U_{sens1,II}}{I_{drv,II}}\right|_{t_{Ref}} = \left.\frac{(1-\Omega^2)}{f_{drv,I} \cdot \Omega} \cdot \frac{U_{sens1,II}}{I_{drv,II}}\right|_{t_{Ref}} = G_{ME,t_{Ref}};$$

a functional value of the functional equation:

$$\left.\frac{\left(1-\frac{f_{drv,II}^2}{f_{drv,I}^2}\right)}{f_{drv,II}} \cdot \frac{U_{sens1,II}}{U_{drv,II}} \cdot Z_{drv,II}\right|_{t_{Ref}} = \left.\frac{(1-\Omega^2)}{f_{drv,I} \cdot \Omega} \cdot \frac{U_{sens1,II}}{U_{drv,II}} \cdot Z_{drv,II}\right|_{t_{Ref}} = G_{ME,t_{Ref}};$$

a functional value of the functional equation:

$$\left.\frac{\left(1-\frac{f_{drv,II}^2}{f_{drv,I}^2}\right)}{f_{drv,II}} \cdot \frac{U_{sens1,II}}{I_{drv,II}}\right|_{t_{Ref}} = \left.\frac{(1-\Omega^2)}{f_{drv,I} \cdot \Omega} \cdot \frac{U_{sens1,II}}{I_{drv,II}} \cdot \right|_{t_{Ref}} = G_{ME,t_{Ref}};$$

or
a functional value of the functional equation:

$$\left.\frac{\left(1-\frac{f_{drv,II}^2}{f_{drv,I}^2}\right)}{f_{drv,II}} \cdot \frac{U_{sens1,II}}{U_{drv,II}} \cdot Z_{drv,II}\right|_{t_{Ref}} = \left.\frac{(1-\Omega^2)}{f_{drv,I} \cdot \Omega} \cdot \frac{U_{sens1,II}}{U_{drv,II}} \cdot Z_{drv,II}\right|_{t_{Ref}} =$$

$$G_{ME,Ref}.$$

According to an additional embodiment of the invention, the transmitter electronics is further so adapted that, therewith, the signal frequency of the signal component of second type of the driver signal is set as a function of the signal component of first type of the driver signal and/or as a function of the signal component of first type of the oscillation signal, whereupon the at least one measuring tube, as a result, executes the oscillations outside of resonance with an oscillation frequency dependent equally on the instantaneous eigenfrequency, $f_1$, of the mode of oscillation of first order. Found to be very advantageous, especially also for the purpose of simplifying the diagnosis and, respectively, the system parameter, reference values ultimately actually to be provided therefor with the reference data set, has been, in such case, when the transmitter electronics sets the signal frequency of the signal component of second type of the driver signal, as already indicated, in a predetermined frequency ratio, $$\frac{f_{drv,II}}{f_1} = \frac{f_{drv,II}}{f_{drv,I}}\Omega,$$

for instance, a ratio held in the non-volatile data memory, to the instantaneous eigenfrequency, $f_1$, of the mode of oscillation of first order, or to the instantaneous signal frequency of the signal component of first type of the driver signal. For this case, it was possible, namely, to replace the frequency ratio, $$\frac{(1-\Omega^2)}{\Omega}$$

appearing in some of the functional equations applied for ascertaining the system parameter, measuring-, or—reference values (compare, in each case, points e, f, g, and h, respectively) by the factor one, so that it no longer requires an extra calculation.

Based on the reference data set and a corresponding measured data set, consequently a measured data set representing the instantaneous operating state of the measuring system at the point in time $t_i$, namely based on a deviation, $\Delta G_{ME}$, ascertained between the reference data set and said measured data set—, for instance, a deviation ascertained by comparison—, the transmitter electronics can then detect, whether and/or to what extent the measuring system has changed in comparison to the reference state ascertained earlier therefor, and, in given cases, a corresponding system status report can be generated. The measured data set naturally formed earlier by means of measured values produced during operation of the measuring system, namely the system parameter, measured values, can be stored therefor, for example, first also in a data memory of the transmitter electronics for measured values produced by means of the measuring system, for instance, the mentioned volatile data memory RAM. For example, the transmitter electronics can compare the reference data set with the measured data set by determining an—absolute or relative—deviation, $\Delta G_{ME}$, between at least one of the system parameter, measured values forming the measured data set and a corresponding system parameter, reference value, namely that representing the same system parameter; for instance, the transmitter electronics ascertains a difference, $(G_{ME,ti} - G_{ME,Ref}) \rightarrow \Delta G_{ME}$, between said system parameter, measured value and the corresponding system parameter, reference value, thus an absolute deviation, and/or that the transmitter electronics ascertains a ratio, $$\frac{G_{ME,ti}}{G_{ME,Ref}} - 1 \rightarrow \Delta G_{ME}$$

of said system parameter, measured value to the corresponding system parameter, reference value, thus a relative deviation. Taking into consideration the above named system parameter, measured values and the, in each case, corresponding system parameter, reference values, the deviation, $\Delta G_{ME}$, can be directly ascertained, for example, from the following functional equations:

$$\left. \frac{\left(1 - \frac{f_{drv,II}^2}{f_{drv,I}^2}\right)}{f_{drv,II}} \cdot Z_{drv,II} \right|_{t_i} = \left. \frac{\left(1 - \frac{f_{drv,II}^2}{f_{drv,I}^2}\right)}{f_{drv,II}} \cdot \frac{U_{sens1,II}}{U_{drv,II}} \cdot Z_{drv,II} \right|_{t_{Ref}} = \Delta G_{ME};$$

and/or $$\frac{\left. \frac{\left(1 - \frac{f_{drv,II}^2}{f_{drv,I}^2}\right)}{f_{drv,II}} \cdot \frac{U_{sens1,II}}{U_{drv,II}} \cdot Z_{drv,II} \right|_{t_i}}{\left. \frac{\left(1 - \frac{f_{drv,II}^2}{f_{drv,I}^2}\right)}{f_{drv,II}} \cdot \frac{U_{sens1,II}}{U_{drv,II}} \cdot Z_{drv,II} \right|_{t_{Ref}}} - 1 = \Delta G_{ME}; \text{ and/or}$$

$$\left. \frac{\left(1 - \frac{f_{drv,II}^2}{f_{drv,I}^2}\right)}{f_{drv,II}} \cdot \frac{U_{sens1,II}}{I_{drv,II}} \right|_{t_i} = \left. \frac{\left(1 - \frac{f_{drv,II}^2}{f_{drv,I}^2}\right)}{f_{drv,II}} \cdot \frac{U_{sens1,II}}{I_{drv,II}} \right|_{t_{Ref}} = \Delta G_{ME}; \text{ and/or}$$

$$\frac{\left. \frac{\left(1 - \frac{f_{drv,II}^2}{f_{drv,I}^2}\right)}{f_{drv,II}} \cdot \frac{U_{sens1,II}}{I_{drv,II}} \right|_{t_i}}{\left. \frac{\left(1 - \frac{f_{drv,II}^2}{f_{drv,I}^2}\right)}{f_{drv,II}} \cdot \frac{U_{sens1,II}}{I_{drv,II}} \right|_{t_{Ref}}} - 1 = \Delta G_{ME}.$$

For the purpose of generating a suitable system status report, namely one signaling an unallowably, or undesired, high deviation of the instantaneous operating from the corresponding reference state, there can be held in the transmitter electronics, for instance, in the non-volatile data memory EEPROM, a corresponding threshold value, for instance, one predetermined by the manufacturer, which represents, in each case, a measure of tolerance allowable for the deviation, $\Delta G_{ME}$. The transmitter electronics can then, for example, be so adapted that it issues the system status report, when the ascertained deviation, $\Delta G_{ME}$, exceeds the measure of tolerance predetermined therefor, in each case, in the form of said threshold value amounting to, for example, 0.1% of the respective system parameter, reference value.

The aforementioned, respectively required, calculational functions, especially also the system parameter, measuring- and—reference values, required for ascertaining the deviation of the measuring system from its reference state, for instance, as ascertained in the plant of the manufacturer, or first on-site, can be very easily implemented e.g. by means of the above mentioned microcomputer µC of the evaluating circuit or, for example, also by means of a digital signal processor DSP correspondingly provided therein. The creation and implementing of corresponding algorithms, which correspond to the above-described formulas or, for example, also simulate the operation of the mentioned amplitude—, or frequency control circuit for the exciter mechanism, as well as their translation into program code correspondingly executable in the transmitter electronics, is, moreover, known to those skilled in the art and needs, consequently, —, in any event, with knowledge of the present invention— no detailed explanation. Of course, the aforementioned formulas, or other functionalities of the measuring system implemented with the transmitter electronics can also be directly wholly or partially realized by means of corresponding discretely constructed and/or hybrid, thus mixed analog-digital, calculational circuits in the transmitter electronics ME.

The invention claimed is:
1. A measuring system for flowing media, said measuring system comprising:
   a measuring transducer of a vibration-type configured to convey a medium therethrough during operation, said measuring transducer comprising:
      a measuring tube, which extends with an oscillatory length between an inlet-side first measuring tube end and an outlet-side second measuring tube end, said measuring tube exhibiting a plurality of natural oscillation modes, wherein said measuring tube is configured to convey the medium;

an oscillation exciter adapted to convert electrical excitation power into vibrations of said measuring tube; and an oscillation sensor configured to measure the vibrations of said measuring tube and to generate an oscillation signal representing the vibrations; and a transmitter electronics electrically connected to the measuring transducer and adapted to:

provide a driver signal to the oscillation exciter, thereby supplying electrical excitation power to the oscillation exciter for effecting the vibrations of said measuring tube, provide said driver signal with a sinusoidal signal component of a first type with a signal frequency corresponding to an instantaneous eigenfrequency of a natural mode of oscillation of said measuring tube such that said measuring tube executes, at least partially, resonance oscillations with an oscillation frequency corresponding to the instantaneous eigenfrequency of said natural mode of oscillation, wherein the oscillation signal includes a sinusoidal signal component of a first type with a signal frequency that corresponds to the signal frequency of the signal component of the first type of the driver signal;

provide said driver signal with a sinusoidal signal component of a second type, which deviates from each instantaneous eigenfrequency of said measuring tube by more than 1 Hz and/or by more than 1% of said eigenfrequency, wherein the driver signal and the oscillation signal are generated such that said measuring tube excites, at least partially, forced oscillations out of resonance and such that said oscillation signal includes a sinusoidal signal component of a second type having a signal frequency corresponding to said signal frequency of the signal component of the second type of the driver signal;

generate, using the signal component of the first type of the oscillation signal, measured values that represent at least one of: a mass flow rate, a totaled mass flow, a density and a viscosity of the medium; and generate, using the signal component of the second type of the oscillation signal, a system status report that indicates at least one of:
wear of the measuring tube exceeding a predetermined tolerance;
that structural integrity of said measuring tube is no longer assured;
that a deposit has formed on an inner surface of the measuring tube during operation;
a loss of material of said measuring tube exceeding a predetermined tolerance;
a crack has formed in said measuring tube;
a change of oscillation characteristics of said measuring tube exceeding a predetermined tolerance;
a change of an electrical impedance of said measuring transducer exceeding a predetermined tolerance;
that a deviation of the measuring system from a reference state exceeds a predetermined tolerance; and
that a change of at least one of: an electrical impedance of said oscillation exciter, an electro-mechanical transducer constant of said oscillation exciter, an electrical impedance of said oscillation sensor, and an electro-mechanical transducer constant of said oscillation sensor exceeds a predetermined tolerance.

2. The measuring system as claimed in claim 1, wherein: the signal frequency of said sinusoidal signal component of the second type of the driver signal deviates from each instantaneous eigenfrequency of said measuring tube by more than 10 Hz.

3. The measuring system as claimed in claim 1, wherein: the signal frequency of said sinusoidal signal component of the second type of the driver signal deviates from each instantaneous eigenfrequency of said measuring tube by more than 10% of said eigenfrequency.

4. The measuring system as claimed in claim 1, wherein: the transmitter electronics is adapted to generate, using the signal component of the second type of the oscillation signal, a system status report that signals that the structural integrity of said measuring tube is no longer assured as a result of at least one of: material removal, overloading, crack formation, and material fatigue.

5. The measuring system as claimed in claim 1, wherein: the measuring tube is U-shaped.

6. The measuring system as claimed in claim 1, wherein: the measuring tube is V-shaped.

7. The measuring system as claimed in claim 1, wherein: the signal frequency of said sinusoidal signal component of the second type of the oscillation signal does not correspond to any of the instantaneous eigenfrequencies of said measuring tube.

8. The measuring system as claimed in claim 1, wherein: the transmitter electronics is adapted to generate the status report in a visually perceptible manner.

9. The measuring system as claimed in claim 1, wherein: the transmitter electronics is adapted to generate the status report in an acoustically perceptible manner.

10. The measuring system as claimed in claim 1, wherein: the transmitter electronics is adapted to generate the system status report in the form of an alarm.

11. The measuring system as claimed in claim 1, wherein: said transmitter electronics includes a data memory for measured values produced by the measuring system, in which data memory is stored a data set of measured values produced during operation of the measuring system and representing an operating state of the measuring system, said data set including system parameter measured values for different system parameters characterizing the measuring system and said data set produced based on at least one of: the signal component of the second type of the driver signal and the signal component of the second type of said sensor signal from said oscillation sensor.

12. The measuring system as claimed in claim 11, wherein the data set includes at least one of:
a system parameter measured value for the signal component of the second type of said driver signal provided to said oscillation exciter during operation of the measuring system;
a system parameter measured value for the signal component of the second type of the oscillation signal generated by said measuring transducer during operation of the measuring system; and
a system parameter measured value derived from the signal component of the second type of the driver signal provided to said oscillation exciter and derived from the signal component of the second type of said oscillation signal generated by said measuring transducer during operation of the measuring system.

13. The measuring system as claimed in claim 11, wherein:
said data set includes media parameter measured values for parameters characterizing the medium and said data set produced based on at least one of: the signal component of the first type of the driver signal and the signal component of the first type of said at least one sensor signal.

14. The measuring system as claimed in claim 1, wherein:
the driver signal simultaneously contains the signal component of the first type and the signal component of the second type, whereby said measuring tube, excited by said oscillation exciter, simultaneously executes partially resonance oscillations with an oscillation frequency corresponding to the instantaneous eigenfrequency of the mode of oscillation of first order, and partially forced oscillations out of resonance.

15. The measuring system as claimed in claim 1, wherein:
the signal frequency of the signal component of the second type of the driver signal is greater than 5 Hz.

16. The measuring system as claimed in claim 1, wherein:
the signal frequency of the signal component of the second type of the driver signal corresponds to more than 1.01 times and less than 2.7 times the instantaneous eigenfrequency of the mode of oscillation of first order, whereby:
said measuring tube, excited by said oscillation exciter, executes, at least partially, forced oscillations out of resonance with an oscillation frequency lying in a frequency range above 1.01 times and below 2.7 times the instantaneous eigenfrequency of the mode of oscillation of first order; and
the signal frequency of the second signal component of the oscillation signal lies above 1.01 times and below 2.7 times the instantaneous eigenfrequency of the mode of oscillation of first order.

17. The measuring system as claimed in claim 16, wherein:
said transmitter electronics changes the signal frequency of the signal component of the second type of the driver signal in a step-wise manner within the frequency range above 1.01 times and below 2.7 times the instantaneous eigenfrequency of the mode of oscillation of first order.

18. The measuring system as claimed in claim 1, wherein:
the signal frequency of the signal component of the second type of the driver signal is smaller than an instantaneous eigenfrequency of a mode of oscillation of a second order of the measuring tube, in which mode of oscillation said measuring tube executes, about a resting position, oscillations that exhibit at or near a first end and a second end of the measuring tube, respectively, an oscillation node and, in a region of a desired oscillatory length, exactly two oscillatory antinodes, whereby:
the measuring tube, excited by said oscillation exciter, executes, at least partially, forced oscillations out of resonance in a frequency range below the instantaneous eigenfrequency of the mode of oscillation of second order; and
the oscillatory signal includes, at least at times, a signal component of the second type with a signal frequency below the instantaneous eigenfrequency of the mode of oscillation of second order.

19. The measuring system as claimed in claim 18, wherein:
the signal frequency of the signal component of the second type of the driver signal is smaller than 0.95 times the instantaneous eigenfrequency of the mode of oscillation of the second order.

20. The measuring system as claimed in claim 1, wherein:
the signal frequency of the signal component of the first type of the driver signal corresponds to an instantaneous eigenfrequency of a natural bending oscillation mode, in which said measuring tube executes about a resting position bending oscillations, which exhibit, at or near said first and second measuring tube ends, respectively, an oscillation node and in the region of the oscillatory length exactly one oscillatory antinode, whereby:
said measuring tube, excited by said at least one oscillation exciter, executes, at least partially bending oscillations in resonance with an oscillation frequency corresponding to the instantaneous eigenfrequency of said natural bending oscillation mode; and
the signal frequency of the signal component of the first type of the oscillation signal corresponds to the instantaneous eigenfrequency of said natural bending oscillation mode.

21. The measuring system as claimed in claim 1, wherein:
said measuring tube is straight.

22. The measuring system as claimed in claim 1, wherein:
said measuring tube is straight; and
the signal frequency of the signal component of the first type of the driver signal corresponds to an instantaneous eigenfrequency of a natural torsional oscillation mode, in which said measuring tube executes torsional oscillations about a resting position about an imaginary oscillation axis imaginarily connecting an inlet-side first measuring tube end and an outlet-side second measuring tube end, which torsional oscillations exhibit in a region of said first and second measuring tube ends, respectively, an oscillation node and in a region of a desired oscillatory length exactly one oscillatory antinode, whereby:
said measuring tube, excited by said at least one oscillation exciter, executes, at least partially torsional oscillations in resonance with an oscillation frequency corresponding to the instantaneous eigenfrequency of said torsional oscillation mode; and
the signal frequency of the signal component of the first type of the oscillation signal corresponds to the instantaneous eigenfrequency of said torsional oscillation mode.

23. The measuring system as claimed in claim 1, wherein:
said measuring transducer includes, for conveying the medium, at least two measuring tubes mechanically coupled with one another, of which measuring tubes each extends with a desired oscillatory length between a respective inlet-side first measuring tube end and a respective outlet-side second measuring tube end, and of which measuring tubes each exhibits a natural mode of oscillation of the first order, in which the measuring tube executes eigenoscillations about a respective resting position, which eigenoscillations exhibit at or near said respective first and second measuring tube ends, respectively, an oscillation node and in the region of the desired oscillatory length exactly one oscillatory antinode, and which eigenoscillations exhibit, respectively, an eigenfrequency, which equals the eigenfrequency of the natural mode of oscillation of the first order of the corresponding other measuring tube.

24. The measuring system as claimed in claim 23, wherein:

said oscillation exciter, acting between said at least two measuring tubes, is configured to convert electrical excitation power into vibrations of each of said at least two measuring tubes; and the signal frequency of the signal component of the first type of the driver signal corresponds to the instantaneous eigenfrequency of the natural mode of oscillation of the first order of each of said at least two measuring tubes, whereby each of said at least two measuring tubes, excited by said oscillation exciter, executes, at least partially resonance oscillations with an oscillation frequency corresponding to the instantaneous eigenfrequency of the mode of oscillation of the first order.

25. The measuring system as claimed in claim 1, wherein the signal frequency of the signal component of the second type of the driver signal corresponds to more than 1.15 times and less than 2.7 times the instantaneous eigenfrequency of the mode of oscillation of first order, whereby:

said measuring tube, excited by said at least one oscillation exciter, executes, at least partially, forced oscillations out of resonance with an oscillation frequency lying in a frequency range above 1.15 times and below 2.7 times the instantaneous eigenfrequency of the mode of oscillation of first order; and said signal frequency of the second signal component of the oscillation signal lies above 1.15 times and below 2.7 times the instantaneous eigenfrequency of the mode of oscillation of first order.

26. The measuring system as claimed in claim 1, wherein the signal frequency of the signal component of the second type of the driver signal corresponds to more than 1.15 times and less than 2.7 times the instantaneous eigenfrequency of the mode of oscillation of first order, whereby:

said measuring tube, excited by said at least one oscillation exciter, executes, at least partially, forced oscillations out of resonance with an oscillation frequency lying in a frequency range above 1.15 times and below 2.4 times the instantaneous eigenfrequency of the mode of oscillation of first order and said signal frequency of the second signal component of the oscillation signal lies above 1.15 times and below 2.4 times the instantaneous eigenfrequency of the mode of oscillation of first order.

27. The measuring system as claimed in claim 1, wherein the sinusoidal signal component of the first type of the driver signal includes a plurality of oscillation periods.

28. The measuring system as claimed in claim 1, wherein the sinusoidal signal component of the first type of the oscillation signal includes a plurality of oscillation periods.

29. The measuring system as claimed in claim 1, wherein the sinusoidal signal component of the second type of the driver signal includes a plurality of oscillation periods.

30. The measuring system as claimed in claim 1, wherein the sinusoidal signal component of the second type of the oscillation signal includes a plurality of oscillation periods.

31. The measuring system as claimed in claim 1, wherein the sinusoidal signal component of the second type instantaneously dominates as regards signal power.

* * * * *